(12) United States Patent
Hasegawa et al.

(10) Patent No.: US 11,606,174 B2
(45) Date of Patent: Mar. 14, 2023

(54) TRANSMISSION DEVICE HAVING PROCESSING CIRCUITRY TO DETERMINE TO ARRANGE A OFDM SYMBOL INCLUDING A REFERENCE SIGNAL

(71) Applicant: Mitsubishi Electric Corporation, Tokyo (JP)

(72) Inventors: Fumihiro Hasegawa, Tokyo (JP); Akinori Taira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/479,595

(22) Filed: Sep. 20, 2021

(65) Prior Publication Data
US 2022/0029869 A1    Jan. 27, 2022

Related U.S. Application Data

(62) Division of application No. 16/635,127, filed as application No. PCT/JP2017/029085 on Aug. 10, 2017, now Pat. No. 11,271,786.

(51) Int. Cl.
*H04W 72/04* (2009.01)
*H04L 5/00* (2006.01)
(Continued)

(52) U.S. Cl.
CPC ......... *H04L 5/0023* (2013.01); *H04B 7/0452* (2013.01); *H04L 5/0007* (2013.01);
(Continued)

(58) Field of Classification Search
CPC ............... H04W 80/08; H04W 72/042; H04W 72/0446; H04W 4/06; H04L 27/2613;
(Continued)

(56) References Cited

U.S. PATENT DOCUMENTS

| | | | |
|---|---|---|---|
| 2011/0085606 A1* | 4/2011 | Gaal | H04L 5/0048 375/259 |
| 2013/0294318 A1* | 11/2013 | Amerga | H04W 72/005 370/312 |

(Continued)

FOREIGN PATENT DOCUMENTS

| | | |
|---|---|---|
| JP | 2013-176150 A | 9/2013 |
| JP | 2016-507958 A | 3/2016 |

(Continued)

OTHER PUBLICATIONS

Indian Office Action for Indian Application No. 202148039169, dated May 19, 2022, with English translation.

(Continued)

*Primary Examiner* — Wei Zhao
(74) *Attorney, Agent, or Firm* — Birch, Stewart, Kolasch & Birch, LLP

(57) ABSTRACT

When arranging a reference signal generated by a pseudo-random number on specified time and frequency, an information processing unit (101) determines whether or not to arrange a 1 OFDM symbol or 2 OFDM symbols including a reference signal at a position determined in each slot, and determines whether or not to additionally arrange an OFDM symbol including a reference signal in the same slot. A multiplexing unit (108) performs multiplexing of a reference signal in accordance with the determination by the information processing unit (101).

1 Claim, 21 Drawing Sheets

(51) Int. Cl.
*H04B 7/0452* (2017.01)
*H04L 5/10* (2006.01)
*H04L 27/26* (2006.01)
*H04W 72/0446* (2023.01)
*H04W 80/08* (2009.01)

(52) U.S. Cl.
CPC .............. *H04L 5/0051* (2013.01); *H04L 5/10* (2013.01); *H04L 27/2605* (2013.01); *H04L 27/2613* (2013.01); *H04L 27/26035* (2021.01); *H04L 27/2646* (2013.01); *H04W 72/042* (2013.01); *H04W 72/0446* (2013.01); *H04W 80/08* (2013.01)

(58) Field of Classification Search
CPC . H04L 27/2647; H04L 5/0007; H04L 5/0008; H04L 72/044; H04L 27/261; H04B 7/0452
See application file for complete search history.

(56) References Cited

U.S. PATENT DOCUMENTS

| | | | |
|---|---|---|---|
| 2015/0341931 A1 | 11/2015 | Zhang et al. | |
| 2016/0087709 A1 | 3/2016 | Horiuchi et al. | |
| 2017/0317808 A1 | 11/2017 | You et al. | |
| 2020/0145079 A1* | 5/2020 | Marinier | H04W 52/42 |

FOREIGN PATENT DOCUMENTS

| | | |
|---|---|---|
| JP | 2016-518758 A | 6/2016 |
| WO | WO 2016/064218 A2 | 4/2016 |

OTHER PUBLICATIONS

3GPP TS 36.211 V13.6.0(Jun. 2017), Release 13, p. 108.
Extended European Search Report for European Application No. 17920880.6, dated Jun. 24, 2020.
Huawei et al., "Multiplexing different types of DL RS," 3GPP TSG RAN WG1 NR Ad Hoc Meeting, R1-1710009, Qindao, China, Jun. 27-30, 2017, 8 pages.
Huawei, HiSilicon, Reference signal design for demodulation in NR [online], 3GPP TSG RAN WG1 Meeting #86bis, R1-1608818, Oct. 1, 2016, pp. 1-6.
Indian Examination Report for Indian Application No. 202047003472, dated Mar. 19, 2021, with an English translation.
International Search Report issued in PCT/JP2017/029085 (PCT/ISA/210) dated Oct. 24, 2017.
Korean Office Action, dated Jan. 27, 2021, for Korean Application No. 10-2020-7003178, with an English translation.
Mitsubishi Electric, Views on DL DMRS designs, 3GPP TSG RAN WG1 AH Meeting, R1-1710411, Jun. 16, 2017, pp. 1-5.
Nokia et al., "On design of DL DM-RS for NR physical data channels," 3GPP TSG RAN WG1 NR Ad-Hoc#2, R1-1711305, Qingdao, P.R. China, Jun. 27-30, 2017, 8 pages total.
Samsung, "Scrambling sequence for MU-MIMO", 3GPP TSG RAN WG1 meeting #59bis, R1-100124, Valencia, Spain, Jan. 18-22, 2010, 3 pages.
Samsung, DMRS Design Aspects for NR [online], 3GPP TSG RAN WG1 Meeting #86bis, R1-1609094, Sep. 30, 2016, pp. 1-3.
Spreadtrum Communications, "DMRS configurations for CP-OFDM," 3GPP TSG RAN WG1 NR Ad-Hoc#2, R1-1710362, Qingdao, P.R. China, Jun. 27-30, 2017, 6 pages.
Zou et al., "COFDM: An Overview", IEEE Transactions on Broadcasting, vol. 41, No. 1, Mar. 1995, pp. 1-8.
ZTE, "Discussion on downlink DMRS design," 3GPP TSG RAN WG1 NR Ad-Hoc#2, R1-1710196, Qingdao, P.R. China, Jun. 27-30, 2017, pp. 1-22.
Korean Office Action for Korean Application No. 10-2022-7001144, dated Mar. 29, 2022, with English translation.
ZTE, "Discussion on downlink DMRS design," 3GPP TSG WG1 Meeting #89, Hangzhou, P.R. China, R1-1707130, May 15-19, 2017, 11 pages.
Indian Office Action for Indian Application No. 202148039519, dated Jun. 8, 2022, with English translation.
Japanese Office Action for Japanese Application No. 2019-535537, dated Apr. 12, 2022, with an English translation.
Chinese Office Action and Search Report for Chinese Application No. 201780093652.6, dated Dec. 17, 2021, with an English translation.
European Office Action for EP Application No. 17 920 880.6 dated Nov. 23, 2021.
ZTE, "On transmission setting," 3GPP TSG RAN WG1 NR Ad-Hoc#2, R1-1710182, Qingdao, P.R. China, Jun. 27-30, 2017, pp. 1-5.

* cited by examiner

FIG. 11

| Value | Message<br>Codeword1: on<br>Codeword2: off | Message<br>Codeword1: on<br>Codeword2: off |
|---|---|---|
| 0 | 1 layer, port 0, $n_{SCID} = 0$ | 5 layer, port 0-4, $n_{SCID} = 0$ |
| 1 | 1 layer, port 0, $n_{SCID} = 1$ | 5 layer, port 0-4, $n_{SCID} = 1$ |
| 2 | 1 layer, port 1, $n_{SCID} = 0$ | 6 layer, port 0-5, $n_{SCID} = 0$ |
| 3 | 1 layer, port 1, $n_{SCID} = 1$ | 6 layer, port 0-5, $n_{SCID} = 1$ |
| 4 | 1 layer, port 2, $n_{SCID} = 0$ | reserved |
| 5 | 1 layer, port 2, $n_{SCID} = 1$ | reserved |
| 6 | 1 layer, port 3, $n_{SCID} = 0$ | reserved |
| 7 | 1 layer, port 3, $n_{SCID} = 1$ | reserved |
| 8 | 1 layer, port 4, $n_{SCID} = 0$ | reserved |
| 9 | 1 layer, port 4, $n_{SCID} = 1$ | reserved |
| 10 | 1 layer, port 5, $n_{SCID} = 0$ | reserved |
| 11 | 1 layer, port 5, $n_{SCID} = 1$ | reserved |
| 12 | 2 layer, port 0, 1, $n_{SCID} = 0$ | reserved |
| 13 | 2 layer, port 0, 1, $n_{SCID} = 1$ | reserved |
| 14 | 2 layer, port 2, 3, $n_{SCID} = 0$ | reserved |
| 15 | 2 layer, port 2, 3, $n_{SCID} = 1$ | reserved |
| 16 | 2 layer, port 4, 5, $n_{SCID} = 0$ | reserved |
| 17 | 2 layer, port 4, 5, $n_{SCID} = 1$ | reserved |
| 18 | 3 layer, port 0-2, $n_{SCID} = 0$ | reserved |
| 19 | 3 layer, port 0-2, $n_{SCID} = 1$ | reserved |
| 20 | 4 layer, port 0-3, $n_{SCID} = 0$ | reserved |
| 21 | 4 layer, port 0-3, $n_{SCID} = 1$ | reserved |
| 22 | reserved | reserved |
| 23 | reserved | reserved |
| 24 | reserved | reserved |
| 25 | reserved | reserved |

FIG. 14

| Value | Message<br>Codeword1: on<br>Codeword2: off | Message<br>Codeword1: on<br>Codeword2: on |
|---|---|---|
| 0 | 1 layer, port 0 | 5 layer, port 0-4 |
| 1 | 1 layer, port 1 | 6 layer, port 0-5 |
| 2 | 1 layer, port 2 | 7 layer, port 0-6 |
| 3 | 1 layer, port 3 | 8 layer, port 0-7 |
| 4 | 1 layer, port 4 | 9 layer, port 0-8 |
| 5 | 1 layer, port 5 | 10 layer, port 0-9 |
| 6 | 2 layer, port 0, 1 | 11 layer, port 0-10 |
| 7 | 2 layer, port 2, 3 | 12 layer, port 0-11 |
| 8 | 2 layer, port 4, 5 | reserved |
| 9 | 1 layer, port 6 | reserved |
| 10 | 1 layer, port 7 | reserved |
| 11 | 1 layer, port 8 | reserved |
| 12 | 1 layer, port 9 | reserved |
| 13 | 1 layer, port 10 | reserved |
| 14 | 1 layer, port 11 | reserved |
| 15 | 2 layer, port 6, 7 | reserved |
| 16 | 2 layer, port 8, 9 | reserved |
| 17 | 2 layer, port 10, 11 | reserved |
| 18 | 3 layer, port 0, 1, 6 | reserved |
| 19 | 3 layer, port 2, 3, 8 | reserved |
| 20 | 3 layer, port 4, 5, 10 | reserved |
| 21 | 4 layer, port 0,1,6,7 | reserved |
| 22 | 4 layer, port 2, 3, 8, 9 | reserved |
| 23 | 4 layer, port 4, 5, 10, 11 | reserved |
| 24 | reserved | reserved |
| 25 | reserved | reserved |
| 26 | reserved | reserved |
| 27 | reserved | reserved |
| 28 | reserved | reserved |
| 29 | reserved | reserved |
| 30 | reserved | reserved |
| 31 | reserved | reserved |

| Value | Message<br>Codeword1: on<br>Codeword2: off | Message<br>Codeword1: on<br>Codeword2: off |
|---|---|---|
| 0 | 1 layer, port 0 | 5 layer, port 0-4 |
| 1 | 1 layer, port 1 | 6 layer, port 0-5 |
| 2 | 1 layer, port 2 | reserved |
| 3 | 1 layer, port 3 | reserved |
| 4 | 1 layer, port 4 | reserved |
| 5 | 1 layer, port 5 | reserved |
| 6 | 2 layer, port 0, 1 | reserved |
| 7 | 2 layer, port 2, 3 | reserved |
| 8 | 2 layer, port 4, 5 | reserved |
| 9 | 3 layer, port 0-2 | reserved |
| 10 | 4 layer, port 0-3 | reserved |
| 11 | reserved | reserved |

FIG. 17

| Value | Message<br>Codeword1: on<br>Codeword2: off | Message<br>Codeword1: on<br>Codeword2: on |
|---|---|---|
| 0 | 1 layer, port 0 | 5 layer, port 0-4 |
| 1 | 1 layer, port 1 | 6 layer, port 0-5 |
| 2 | 1 layer, port 2 | 7 layer, port 0-6 |
| 3 | 1 layer, port 3 | 8 layer, port 0-7 |
| 4 | 1 layer, port 4 | 9 layer, port 0-8 |
| 5 | 1 layer, port 5 | 10 layer, port 0-9 |
| 6 | 1 layer, port 6 | 11 layer, port 0-10 |
| 7 | 1 layer, port 7 | 12 layer, port 0-11 |
| 8 | 1 layer, port 8 | reserved |
| 9 | 1 layer, port 9 | reserved |
| 10 | 1 layer, port 10 | reserved |
| 11 | 1 layer, port 11 | reserved |
| 12 | 2 layer, port 0,1 | reserved |
| 13 | 2 layer, port 2, 3 | reserved |
| 14 | 2 layer, port 4, 5 | reserved |
| 15 | 2 layer, port 6, 7 | reserved |
| 16 | 2 layer, port 8, 9 | reserved |
| 17 | 2 layer, port 10, 11 | reserved |
| 18 | 3 layer, port 0, 1, 6 | reserved |
| 19 | 3 layer, port 2, 3, 8 | reserved |
| 20 | 3 layer, port 4, 5, 10 | reserved |
| 21 | 4 layer, port 0, 1, 6, 7 | reserved |
| 22 | 4 layer, port 2, 3, 8, 9 | reserved |
| 23 | 4 layer, port 4, 5, 10, 11 | reserved |
| 24 | reserved | reserved |
| 25 | reserved | reserved |
| 26 | reserved | reserved |
| 27 | reserved | reserved |
| 28 | reserved | reserved |
| 29 | reserved | reserved |
| 30 | reserved | reserved |
| 31 | reserved | reserved |

FIG. 28

| Value | Message<br>Codeword1: on<br>Codeword2: off | Message<br>Codeword1: on<br>Codeword2: off |
|---|---|---|
| 0 | 1 layer, port 0 | 5 layer, port 0-4 |
| 1 | 1 layer, port 1 | 6 layer, port 0-5 |
| 2 | 1 layer, port 2 | reserved |
| 3 | 1 layer, port 3 | reserved |
| 4 | 1 layer, port 4 | reserved |
| 5 | 1 layer, port 5 | reserved |
| 6 | 2 layer, port 0, 1 | reserved |
| 7 | 2 layer, port 2, 3 | reserved |
| 8 | 2 layer, port 4, 5 | reserved |
| 9 | 3 layer, port 0-2 | reserved |
| 10 | 4 layer, port 0-3 | reserved |
| 11 | reserved | reserved |

FIG. 29

| Value | Message<br>Codeword1: on<br>Codeword2: off |
|---|---|
| 0 | 1 layer, port 0, $n_{SCID} = 0$ |
| 1 | 1 layer, port 0, $n_{SCID} = 1$ |
| 2 | 1 layer, port 1, $n_{SCID} = 0$ |
| 3 | 1 layer, port 1, $n_{SCID} = 1$ |
| 4 | 1 layer, port 2, $n_{SCID} = 0$ |
| 5 | 1 layer, port 2, $n_{SCID} = 1$ |
| 6 | 1 layer, port 3, $n_{SCID} = 0$ |
| 7 | 1 layer, port 3, $n_{SCID} = 1$ |
| 8 | 2 layer, port 0, 1, $n_{SCID} = 0$ |
| 9 | 2 layer, port 0, 1, $n_{SCID} = 1$ |
| 10 | 2 layer, port 2, 3, $n_{SCID} = 0$ |
| 11 | 2 layer, port 2, 3, $n_{SCID} = 1$ |
| 12 | 3 layer, port 0-2, $n_{SCID} = 0$ |
| 13 | 3 layer, port 0-2, $n_{SCID} = 1$ |
| 14 | 4 layer, port 0-3, $n_{SCID} = 0$ |
| 15 | 4 layer, port 0-3, $n_{SCID} = 1$ |

FIG. 30

| Value | Message<br>Codeword1: on<br>Codeword2: off | Message<br>Codeword1: on<br>Codeword2: off |
|---|---|---|
| 0 | 1 layer, port 0 | 5 layer, port 0-4 |
| 1 | 1 layer, port 1 | 6 layer, port 0-5 |
| 2 | 1 layer, port 2 | 7 layer, port 0-6 |
| 3 | 1 layer, port 3 | reserved |
| 4 | 1 layer, port 4 | reserved |
| 5 | 1 layer, port 5 | reserved |
| 6 | 1 layer, port 6 | reserved |
| 7 | 1 layer, port 7 | reserved |
| 8 | 2 layer, port 0, 1 | reserved |
| 9 | 2 layer, port 2, 3 | reserved |
| 10 | 2 layer, port 4, 5 | reserved |
| 11 | 2 layer, port 6, 7 | reserved |
| 12 | 3 layer, port 0, 1, 4 | reserved |
| 13 | 3 layer, port 2, 3, 6 | reserved |
| 14 | 4 layer, port 0, 1, 4, 5 | reserved |
| 15 | 4 layer, port 2, 3, 6, 7 | reserved |

FIG. 31

| Value | Message<br>Codeword1: on<br>Codeword2: off | Message<br>Codeword1: on<br>Codeword2: on |
|---|---|---|
| 0 | 1 layer, port 0 | 5 layer, port 0-4 |
| 1 | 1 layer, port 1 | 6 layer, port 0-5 |
| 2 | 1 layer, port 2 | 7 layer, port 0-6 |
| 3 | 1 layer, port 3 | 8 layer, port 0-7 |
| 4 | 1 layer, port 4 | 9 layer, port 0-8 |
| 5 | 1 layer, port 5 | 10 layer, port 0-9 |
| 6 | 1 layer, port 6 | 11 layer, port 0-10 |
| 7 | 1 layer, port 7 | 12 layer, port 0-11 |
| 8 | 1 layer, port 8 | reserved |
| 9 | 1 layer, port 9 | reserved |
| 10 | 1 layer, port 10 | reserved |
| 11 | 1 layer, port 11 | reserved |
| 12 | 2 layer, port group 1-1 | reserved |
| 13 | 2 layer, port group 1-2 | reserved |
| 14 | 2 layer, port group 2-1 | reserved |
| 15 | 2 layer, port group 2-2 | reserved |
| 16 | 2 layer, port group 3-1 | reserved |
| 17 | 2 layer, port group 3-2 | reserved |
| 18 | 3 layer, port group 1 | reserved |
| 19 | 3 layer, port group 2 | reserved |
| 20 | 3 layer, port group 3 | reserved |
| 21 | 4 layer, port group 1 | reserved |
| 22 | 4 layer, port group 2 | reserved |
| 23 | 4 layer, port group 3 | reserved |
| 24 | reserved | reserved |
| 25 | reserved | reserved |
| 26 | reserved | reserved |
| 27 | reserved | reserved |
| 28 | reserved | reserved |
| 29 | reserved | reserved |
| 30 | reserved | reserved |
| 31 | reserved | reserved |

FIG. 32

| Port group name | Configuration 1 (FD-TD OCC) | Configuration 2 (TD OCC, CS) |
|---|---|---|
| 2 layer, port group 1-1 | 0, 1 | 0, 1 |
| 2 layer, port group 1-2 | 6, 7 | 4, 5 |
| 2 layer, port group 2-1 | 2, 3 | 2, 3 |
| 2 layer, port group 2-2 | 8, 9 | 6, 7 |
| 2 layer, port group 3-1 | 4, 5 | |
| 2 layer, port group 3-2 | 10, 11 | |
| 3 layer, port group 1 | 0, 1, 6 | 0, 1, 4 |
| 3 layer, port group 2 | 2, 3, 8 | 2, 3, 6 |
| 3 layer, port group 3 | 4, 5, 10 | |
| 4 layer, port group 1 | 0, 1, 6, 7 | 0, 1, 4, 5 |
| 4 layer, port group 2 | 2, 3, 8, 9 | 2, 3, 6, 7 |
| 4 layer, port group 3 | 4, 5, 10, 11 | |

TRANSMISSION DEVICE HAVING PROCESSING CIRCUITRY TO DETERMINE TO ARRANGE A OFDM SYMBOL INCLUDING A REFERENCE SIGNAL

This application is a Divisional of co-pending U.S. patent application Ser. No. 16/635,127, filed on Jan. 29, 2020, which is a National Phase of PCT International Application No. PCT/JP2017/029085 filed on Aug. 10, 2017. Each of the above applications is hereby expressly incorporated by reference, in its entirety, into the present application.

TECHNICAL FIELD

The present invention relates to a transmission device that arranges a reference signal generated by a pseudorandom number on specified time and frequency.

BACKGROUND ART

In a digital communication system, frequency selectivity and time fluctuation of a transmission path are generated by multipath fading caused by reflection of a transmission signal on a building or the like or Doppler fluctuation caused by movement of a terminal. In such a multipath environment, a received signal is a signal in which a transmitted symbol interferes with a symbol that arrives after a delay time.

In such a multipath environment, in order to obtain the best reception characteristics, an orthogonal frequency division multiplexing (OFDM) transmission scheme that is a multicarrier (multiple carrier: MC) block transmission is used (for example, see Non-Patent Literature 1).

Further, in such a multipath environment, a multiple input multiple output (MIMO) wireless transmission scheme using a plurality of transmission/reception antennas is used to improve communication capacity. In MIMO communication, transmission layers are multiplexed to improve the communication capacity, and layer multiplexing for multiple users is called multiuser MIMO. In the multiuser MIMO, multiple layers for multiple users are multiplexed on a transmission side.

Multilayer multiplexing is generally performed using precoding on the transmission side. The precoded signal becomes a signal affected by a transmission path between transmission and reception, and reaches a reception device. In order to estimate the transmission path and demodulate the multiplexed signal, a reference signal inserted on the transmission side is used in the reception device. There are several types of reference signals. For example, there is a demodulation reference signal (DMRS) as one of reference signals defined by a standardization organization 3rd generation partnership project (3GPP). Since precoding processing is performed on this DMRS, the reception device can use it for precoding processing on the transmission side and transmission path estimation.

In general, in the multiuser MIMO, a unique reference signal is assigned to each layer and to each user. Therefore, on the reception device side, transmission path estimation and demodulation can be performed by using the reference signal assigned to the layer for each device.

CITATION LIST

Non-Patent Literatures

Non-Patent Literature 1: W. Y. Zou and Y. Wu, "COFDM: An overview", IEEE Trans. on Broadcasting, vol. 41, no. 1, March 1995, pp. 1-8.

SUMMARY OF INVENTION

Technical Problem

In the OFDM, it is possible to arrange a reference signal on a subcarrier in frequency or in a resource element (RE) in 3GPP. In the multiuser MIMO, upper limits on the number of users and the number of layers to be spatially multiplexed are determined by the orthogonal number of reference signals. On the other hand, depending on an environment, system throughput can be improved by spatially multiplexing the number of layers and the number of users higher than the orthogonal number. In that case, it is possible to increase the number of multiplexing by generating a quasi-orthogonal sequence. However, conventionally, there has been no mechanism for generating a reference signal and providing a degree of freedom in a generation method in a time and a frequency. Also, control information is increased by increasing the number of quasi-orthogonal sequences, so it is necessary to suppress an increase in the control information. Furthermore, there has been a demand for realization of a mechanism capable of reducing an amount of information for a reception side while selecting from two reference signal multiplexing schemes on the basis of a transmission path environment and a multiplexing scheme.

The present invention has been made to solve such a problem, and an object of the present invention is to provide a transmission device that can improve system throughput and suppress an increase in control information.

Solution to Problem

A transmission device according to the present invention includes: a multiplexing unit for multiplexing a reference signal to data to be transmitted; and an information processing unit for determining, when arranging a reference signal generated by a pseudorandom number on specified time and frequency, whether or not to arrange a 1 OFDM symbol or 2 OFDM symbols containing a reference signal at a position determined in each slot, and for determining whether or not to additionally arrange an OFDM symbol containing a reference signal in the same slot, in which the multiplexing unit performs the multiplexing in accordance with the determination by the information processing unit.

Advantageous Effects of Invention

The transmission device according to the present invention determines whether or not to arrange the 1 OFDM symbol or the 2 OFDM symbols containing the reference signal at the position determined in each slot, and determines whether or not to additionally arrange the OFDM symbol containing the reference signal in the same slot. As a result, system throughput can be improved, and an increase in control information can be suppressed.

BRIEF DESCRIPTION OF DRAWINGS

FIG. 11 is an explanatory diagram showing a DCI table for the 1OFDM symbol of the transmission device according to the first embodiment of the present invention.

FIG. 14 is an explanatory diagram showing a DCI table for the 2OFDM symbol in the transmission device according to the first embodiment of the present invention.

FIG. 17 is an explanatory diagram showing another DCI table for the 2OFDM symbol in the transmission device according to the first embodiment of the present invention.

FIG. 28 is an explanatory diagram showing a common DCI table for the 1OFDM symbol in the transmission device according to the second embodiment of the present invention.

FIG. 29 is an explanatory diagram showing a CS DCI table for the 1OFDM symbol in the transmission device according to the second embodiment of the present invention.

FIG. 30 is an explanatory diagram showing a DCI table for the two symbols in the transmission device according to the second embodiment of the present invention.

FIG. 31 is an explanatory diagram showing a common DCI table for the two symbols in the transmission device according to the second embodiment of the present invention.

FIG. 32 is an explanatory diagram showing a correspondence table between port groups and port numbers in the transmission device according to the second embodiment of the present invention.

DESCRIPTION OF EMBODIMENTS

Hereinafter, in order to explain the present invention in more detail, embodiments for carrying out the present invention will be described with reference to the accompanying drawings.

First Embodiment

Figure 1:
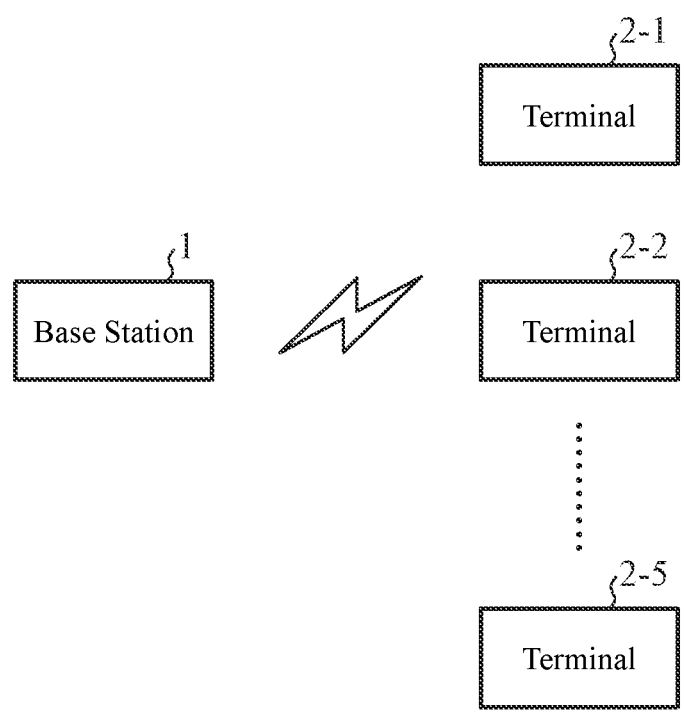
FIG. 1 is a configuration diagram of a communication system to which a transmission device according to the present invention is applied.

FIG. 1 is a configuration diagram showing a communication system using a transmission device according to a first embodiment of the present invention. The communication system of the present embodiment includes a base station 1 and terminals 2-1 to 2-5. Note that, although FIG. 1 shows an example in which the number of terminals 2-1 to 2-5 is five, the number of terminals 2-1 to 2-5 is not limited to five as long as it is plural. The terminals 2-1 to 2-5 are communication devices that are also called reception devices, user terminals, or user equipment (UE). In downlink communication, the base station 1 is a transmission side device using the transmission device of the present embodiment, and the terminals 2-1 to 2-5 are reception side devices. The communication system of the present embodiment uses an OFDM scheme in the downlink communication. Further, a reference signal is called a DMRS in 3GPP.

Figure 2:
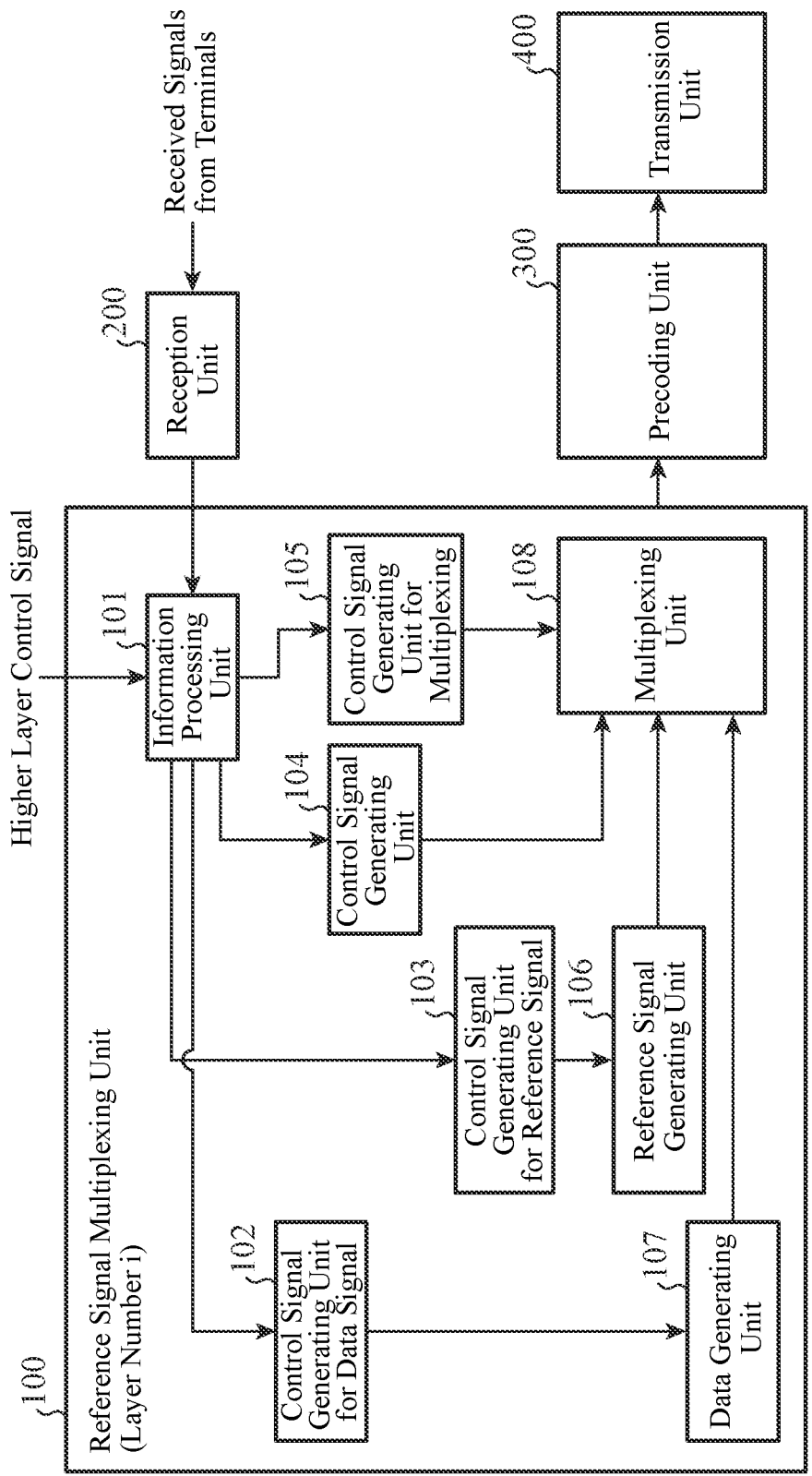
FIG. 2 is a configuration diagram showing a transmission device according to a first embodiment of the present invention.

FIG. 2 is a configuration diagram showing the transmission device according to the present embodiment.

The illustrated transmission device includes a reference signal and data multiplexing unit 100, a reception unit 200, a precoding unit 300, and a transmission unit 400. The reference signal and data multiplexing unit 100 is a processing unit that multiplexes a reference signal to data transmitted from the transmission device, and is illustrated as a processing unit of layer number i. The reception unit 200 is a processing unit for performing predetermined reception processing as a transmission side device on received signals from the terminals 2-1 to 2-5 shown in FIG. 1. The precoding unit 300 is a processing unit that multiplexes signals of the reference signal and data multiplexing unit 100 of each layer. The transmission unit 400 is a processing unit for transmitting a signal output from the precoding unit 300 as a transmission signal to a transmission path.

The reference signal and data multiplexing unit 100 includes an information processing unit 101, a control signal generating unit 102 for a data signal, a control signal generating unit 103 for a reference signal, a control signal generating unit 104, a control signal generating unit 105 for multiplexing, a reference signal generating unit 106, a data generating unit 107, and a multiplexing unit 108. The information processing unit 101 is a processing unit for performing, on the basis of a higher layer control signal or a request signal from the reception unit 200, with respect to the control signal generating unit 102 for the data signal to the control signal generating unit 105 for multiplexing, processing corresponding to control signals generated by the control signal generating units. In other words, processing such as whether or not to arrange a 1 OFDM symbol or 2 OFDM symbols, which will be described later, and a series of processing such as whether or not to additionally arrange an OFDM symbol containing a reference signal in the same slot are determined by the information processing unit 101.

The control signal generating unit 102 for the data signal is a processing unit that generates, on the basis of control information from the information processing unit 101, a control signal for the data generating unit 107. The control signal generating unit 103 for the reference signal is a processing unit that generates, on the basis of control information from the information processing unit 101, a control signal to the reference signal generating unit 106. The control signal generating unit 104 is a processing unit that generates, on the basis of control information from the information processing unit 101, a control signal for notifying the reception side of a position or a signal arrangement position of a reference signal, and a position of a data signal. The control signal generating unit 105 for multiplexing is a processing unit that generates, on the basis of control information from the information processing unit 101, a control signal for controlling multiplexing processing of the multiplexing unit 108. The reference signal generating unit 106 is a processing unit that generates, on the basis of the control signal from the control signal generating unit 103 for the reference signal, a reference signal to be described later. The data generating unit 107 is a processing unit that generates data to be transmitted to the terminals 2-1 to 2-5. The multiplexing unit 108 is a processing unit that multiplexes, on the basis of the control signals from the control signal generating unit 104 and the control signal generating unit 105 for multiplexing, the reference signal generated by the reference signal generating unit 106 to the data generated by the data generating unit 107.

Information included in the higher layer control signal includes the number of terminals, a terminal capability and type, and the like. Since the number of reception antennas and the like change depending on the terminal capability, the base station 1 needs to adaptively change the number of layers that can be transmitted. The contents of the information included in the higher layer control signal will be described later. Note that, in the present embodiment, the information processing unit 101 is disposed in each layer, but the information processing unit 101 common to each layer may be installed. In that case, control information corresponding to each layer is generated.

Figure 3:
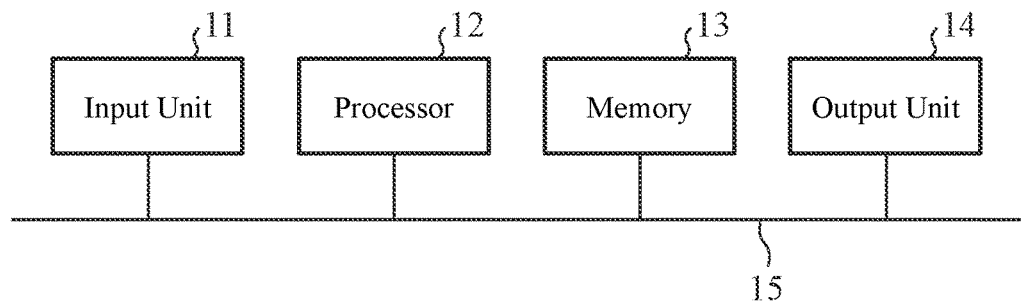
FIG. 3 is a hardware configuration diagram of the transmission device according to the first embodiment of the present invention.

When there are components to be implemented by software among the components of the transmission device shown in FIG. 2, for example, the components to be implemented by the software are implemented by a control circuit shown in FIG. 3. As shown in FIG. 3, the control circuit includes an input unit 11 that is a reception unit that receives data input from the outside, a processor 12, a memory 13, an output unit 14 that is a transmission unit that transmits data to the outside, and a bus 15 that connects them to each other. The input unit 11 is an interface circuit that receives data input from the outside of the control circuit and gives it to the processor 12, and the output unit 14 is an interface circuit that sends data from the processor 12 or the memory 13 to the outside of the control circuit. When at least a part of the components shown in FIG. 2 is implemented by the control circuit shown in FIG. 3, it is implemented by the processor 12 that reads and executes a program stored in the memory 13 and corresponding to each component of the transmission device. The memory 13 is also used as a temporary memory in each processing performed by the processor 12.

Figure 4:
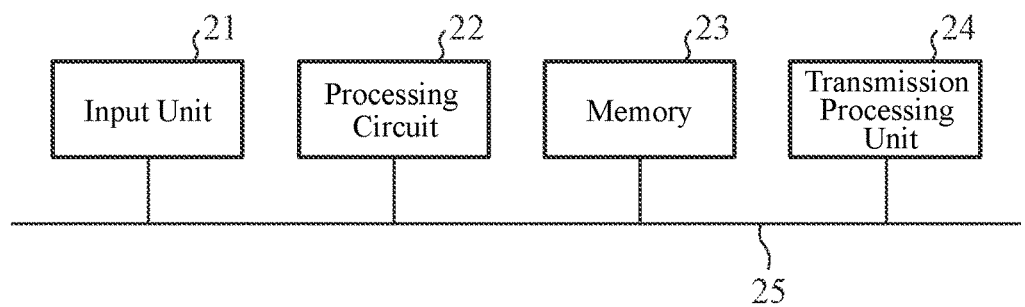
FIG. 4 is a hardware configuration diagram showing another hardware configuration of the transmission device according to the first embodiment of the present invention.

Further, components to be implemented only by hardware are implemented by a circuit shown in FIG. 4. The circuit shown in FIG. 4 includes an input unit 21 that is a reception unit that receives data input from the outside, a processing circuit 22, a memory 23, a transmission processing unit 24 that is a transmission unit that transmits data to the outside, and a communication path 25 for connecting them to each other. The input unit 21 is an interface circuit that receives data input from the outside and gives it to the processing circuit 22, and the transmission processing unit 24 is an interface circuit that sends data from the processing circuit 22 or the memory 23 to the outside. When at least a part of the components is implemented by the circuit shown in FIG. 4, the processing circuit 22 consists of a plurality of circuit configurations, and a circuit corresponding to each component of the transmission device shown in FIG. 2 is used. When implemented by the circuit shown in FIG. 4, the memory 23 is also used as a storage location for data used by the processing circuit 22.

Hereinafter, processing in the information processing unit 101 will be described.

Figure 5:
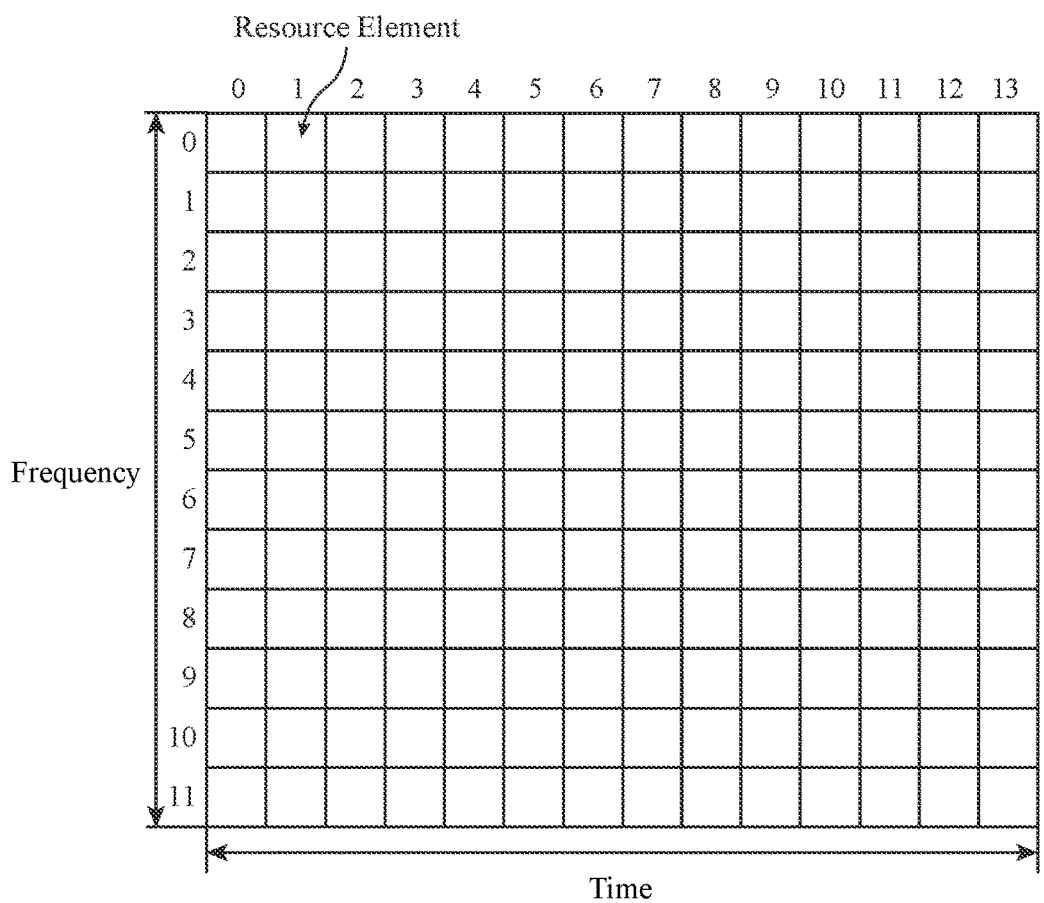
FIG. 5 is an explanatory diagram showing definitions on a frequency and a time of the transmission device according to the first embodiment of the present invention.

In a 3GPP standard, a reference signal is arranged in a Resource Element (hereinafter, referred to as RE) of a time and a frequency. The Resource element indicates a unit on the frequency and the time, and in the 3GPP, a group composed of twelve carriers and seven symbols is called a 1 Resource block (hereinafter, referred to as RB). In OFDM transmission, one symbol in time and frequency in data or reference signal arrangement is also called a 1 OFDM symbol. In the present embodiment, a position of the RE is described as (frequency, time). For example, a position of an arrow described as "Resource element" in FIG. 5 is (0, 1). Note that, in the present embodiment, for simplification, an example limited to the 1 RB is shown. However, the present invention is a technique that can also be applied to DMRSs arranged in a plurality of RBs. Note that, in the present embodiment, a slot is a unit composed of fourteen symbols. Further, DMRSs arranged in a plurality of REs are called a DMRS sequence, and the DMRS sequence is composed of a plurality of symbols. A generation method is determined by a standard, and is a well-known generation method for the terminals 2-1 to 2-5.

Note that the DMRS targeted in the present invention is a data DMRS. In other words, the terminals 2-1 to 2-5 receive the DMRS, perform transmission path estimation, and perform data demodulation.

Figure 6:
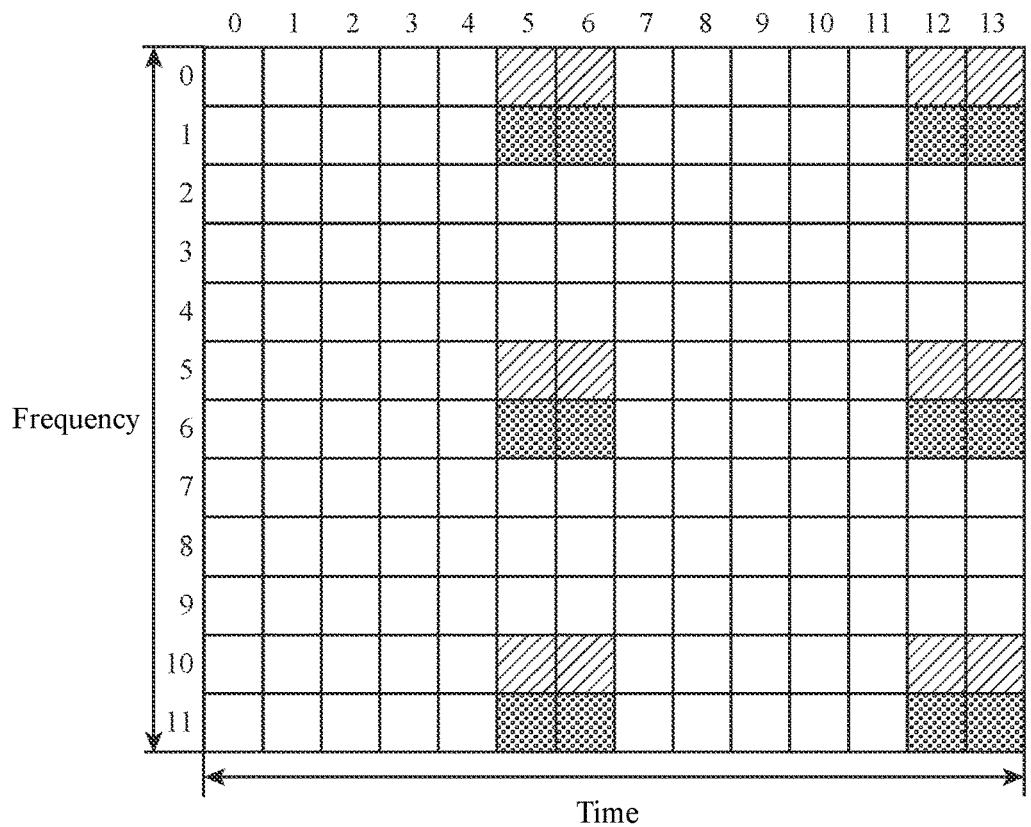
FIG. 6 is an explanatory diagram showing LTE DMRS arrangement positions in the transmission device according to the first embodiment of the present invention.
Figure 7:
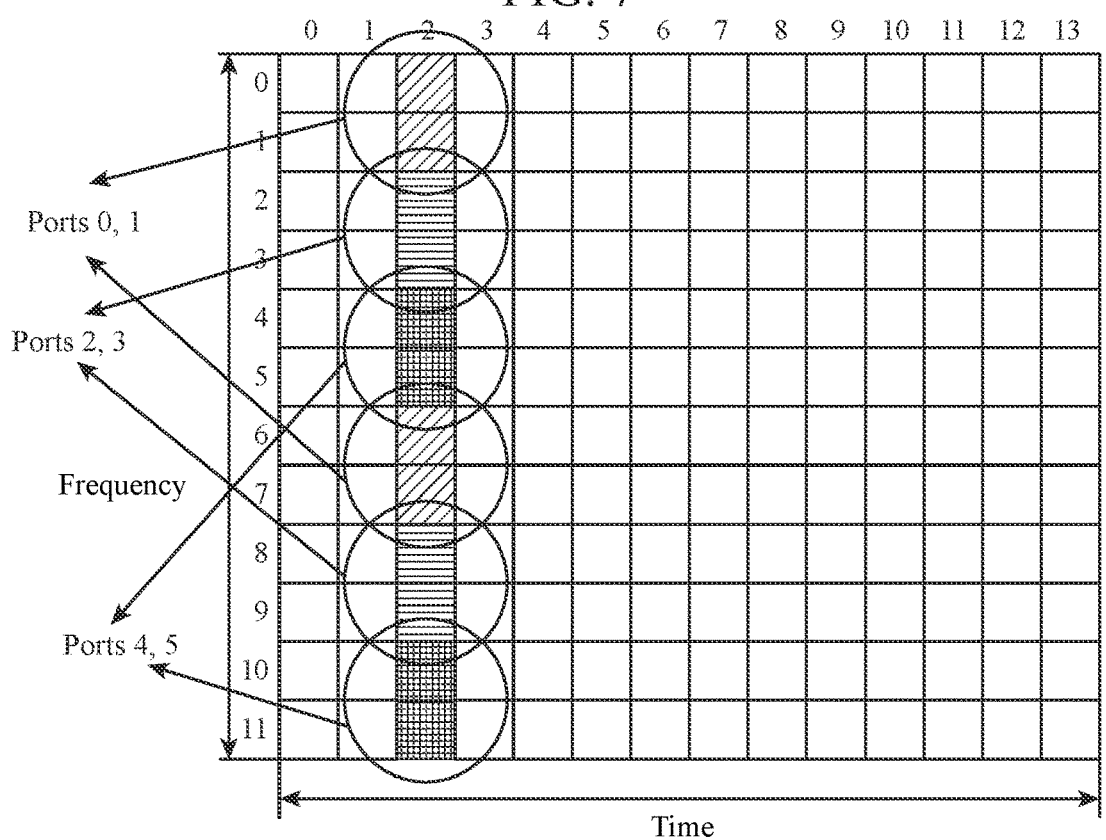
FIG. 7 is an explanatory diagram showing DMRS arrangement and port mapping of a 1OFDM symbol in the transmission device according to the first embodiment of the present invention.

Here, the layer is called a port in accordance with the 3GPP standard. It is also possible to map one layer to a plurality of ports. Further, it is also possible to map a layer to a port multiple times by mapping from the layer to a virtual port and by mapping from the virtual port to the port. In this example, only an example of mapping from a layer to a port only once is described. In a long term evolution (LTE) standard, each port of a DMRS multiplexed with a data signal and placed is arranged with a continuous DMRS on a time as shown in FIG. 6. For example, a DMRS corresponding to a port 0 is arranged in (0, 5), (0, 6), (0, 12), (0, 13), (5, 5), (5, 6), (5, 12), (5, 13), (10, 5), (10, 6), (10, 12), and (10, 13). Further, an orthogonal cover code (OCC) is multiplied in a time direction, and a plurality of layers can be multiplexed by the OCC. For example, when $s_i$ is a DMRS that can be represented by a complex number, $s_0$ is arranged in (0, 5), $s_1$ in (0, 6), $s_2$ in (0, 12), and $s_3$ in (0, 13). Then, an OCC in one-to-one correspondence to a port number is multiplied. In this example, a 4-bit OCC is used. For example, for the port 0, $s_0$ is arranged in (0, 5), $s_1$ in (0, 6), $s_2$ in (0, 12), and $s_3$ in (0, 13). Then, for a port 1, $s_0$ is arranged in (0, 5), $-s_1$ in (0, 6), $s_2$ in (0, 12), and $-s_3$ in (0, 13). Also, for a port 4, $s_0$ is arranged in (0, 5), $s_1$ in (0, 6), $-s_2$ in (0, 12), and $-s_3$ in (0, 13). Moreover, for a port 6, $s_0$ is arranged in (0, 5), $-s_1$ in (0, 6), $-s_2$ in (0, 12), and $+s_3$ in (0, 13). Since the OCC causes orthogonality between encoded DMRSs, if the reception side knows the OCC for each port, decomposition is possible. FIG. 7 shows the ports and mapping.

Figure 8:
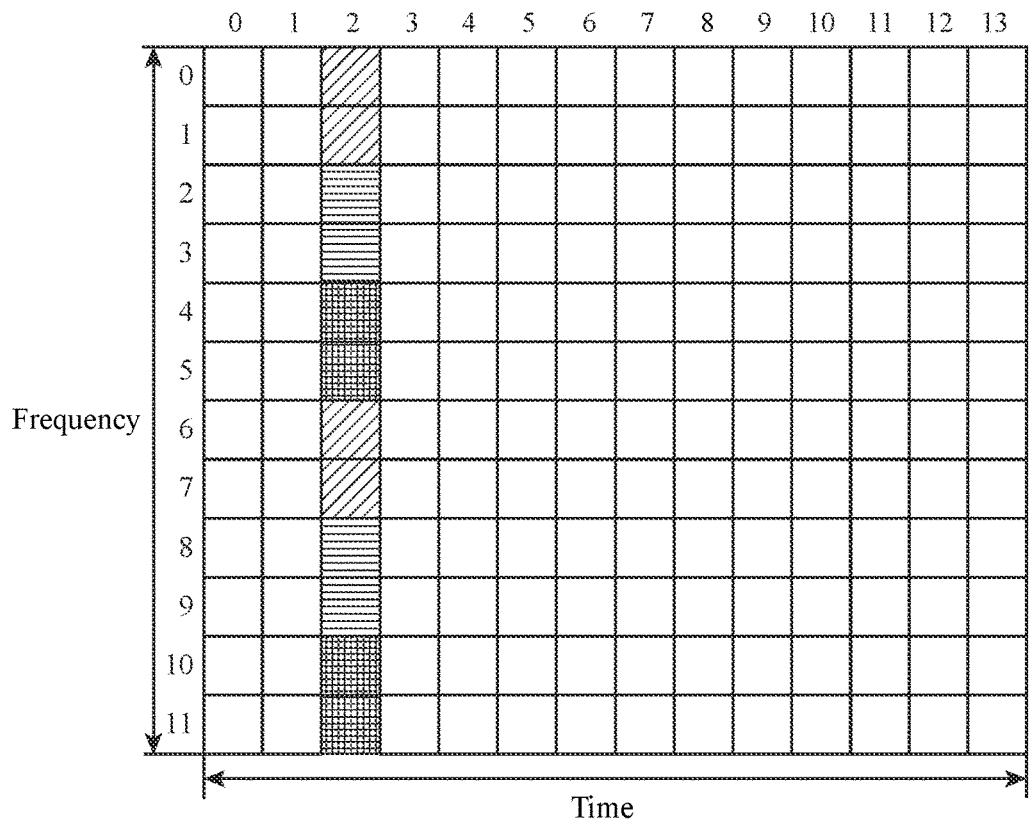
FIG. 8 is an explanatory diagram showing the DMRS arrangement of the 1OFDM symbol in the transmission device according to the first embodiment of the present invention.

As described above, in LTE, OCC is applied in the time domain. In the present invention, DMRSs are arranged in REs that are continuous in the time domain and a frequency domain. For example, as shown in FIG. 8, when $s_i$ is a DMRS that can be represented by a complex number, $s_0$ is arranged in (0, 2), $s_1$ in (1, 2), $s_2$ in (6, 2), and $s_3$ in (7, 2). Then, in this example, the OCC is multiplied. In a DMRS for the port 0, $s_0$ is in (0, 2), $s_1$ in (1, 2), $s_2$ in (6, 2), and $s_3$ in (7, 2), and in a DMRS for the port 1, $s_0$ is in (0, 2), $-s_1$ in (1, 2), $s_2$ in (6, 2), and $-s_3$ in (7, 2). In other words, a 2-bit OCC is multiplied in units of adjacent REs. The other ports are arranged in REs indicated by horizontal lines or grids in FIG. 8. In other words, in the REs shown in FIG. 8, DMRSs for six ports can be arranged. A pattern in which a DMRS is arranged in the first maximum 2 OFDM symbols in the slot in this way is called frontloaded (hereinafter, referred to as FL). Note that symbols of different values may be used for $s_0$ and $s_1$, or the same symbol may be used. In other words, the same symbol may be used for DMRSs arranged in REs adjacent to each other in frequency, such as (0, 2) and (1, 2). Further, for example, the same symbol may be used for DMRSs arranged in REs adjacent to each other in time, such as (0, 2) and (0, 3). Also, the same symbol may be used for DMRSs arranged in REs adjacent on the frequency and the time, such as (0,2), (1,2), (0,2), and (0,3).

Figure 9:
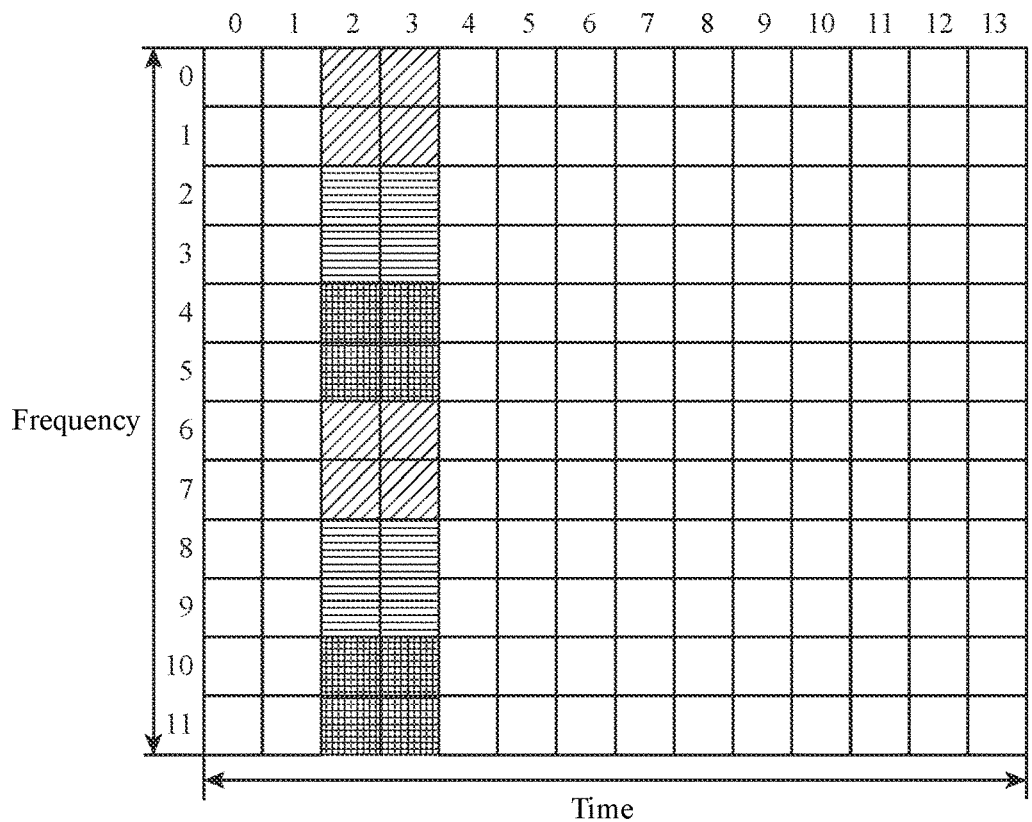
FIG. 9 is an explanatory diagram showing DMRS arrangement of a 2OFDM symbol in the transmission device according to the first embodiment of the present invention.

In the above example, the DMRSs for six ports can be transmitted using a 1 OFDM symbol. On the other hand, as shown in FIG. 9, DMRSs can be transmitted using two symbols. In this case, DMRS transmission for six ports or twelve ports is possible.

First, an example in which 6-port transmission is performed using 2 OFDM symbols will be described. As shown in FIG. 9, $s_0$ is arranged in (0, 2), $s_1$ in (1, 2), $s_2$ in (6, 2), and $s_3$ in (7, 2). Similarly, $s_0$ is arranged in (0, 3), $s_1$ in (1, 3), $s_2$ in (6, 3), and $s_3$ in (7, 3). Since an application example of an OCC for spatially multiplexing layers is as described above, description thereof is omitted here. In other words, when the DMRSs for six ports are transmitted using the 2 OFDM symbols, the same DMRS sequence may be inserted into the two symbols. Also, a sequence different from the DMRS sequence inserted into symbol number 2 may be inserted so that $t_0$ is in (0, 3), $t_1$ in (1, 3), $t_2$ in (6, 3), and $t_3$ in (7, 3). In other words, a generation sequence may be selected for each symbol.

Any sequence may be used for a symbol sequence generation method, and, for example, a method as described in Chapter 6.10.3.1 of a document: 3GPP TS 36.211, "Physical channels and modulation", V13.6.0 (2017 June) may be used.

Note that a Pseudo Number (pseudorandom number) may be used for a generated sequence as described in the above document. Also, a sequence for the 2 OFDM symbols may be created, or a seed number required for pseudorandom number generation may be changed for each OFDM symbol. The pseudorandom number is generally generated using a shift register or the like. The seed number may be an output of a function designated by a standard or may be designated directly. Function parameters may depend on adjustable parameters such as a slot number, a cell ID, a parameter value set in a higher layer, and a DMRS sequence length. Note that notification of a designated seed number or parameters necessary for generating the seed number may be made by using a higher layer or a lower layer. In the 3GPP, radio resource control (RRC) or the like is used by the higher layer, and downlink control information (DCI) or medium access control-control element (MAC-CE) is used for notification by the lower layer.

The DCI is included in a physical downlink control channel (PDCCH) in 3GPP. The PDCCH is generally transmitted using first few OFDM symbols of a slot. In the present embodiment, it is assumed that the PDCCH is transmitted using the first two symbols, and it is assumed that the DMRS is transmitted from symbol number 2 in the slot. However, the method described in the present embodiment can also be applied to a case where first 3 OFDM symbols of the slot is used for the PDCCH. Further, it is also applicable to a case where the PDCCH is arranged from first 2 OFDM symbols (symbol numbers 0, 1), an OFDM symbol containing data is from symbol number 2, and an OFDM symbol containing a DMRS is arranged from symbol number 3. Note that a position of a first DMRS of FL in each slot is fixed. For example, an OFDM symbol containing a DMRS is always arranged in symbol number 2.

When transmitting a DMRS for a 1 OFDM symbol, the higher layer may notify a parameter for a pseudorandom number for a DMRS sequence for 1 OFDM symbol. When transmitting a DMRS for 2 OFDM symbols, the higher layer may transmit a seed number for each pseudorandom number for a DMRS sequence arranged in each OFDM symbol. Alternatively, in order to generate a DMRS for the 2 OFDM symbols from the same seed number, one seed number may be designated in the higher layer. In that case, a duplicate of the first OFDM symbol may be created and arranged at the 2 OFDM symbols, or pseudorandom number generation for the 2 OFDM symbols may be performed to generate a DMRS for the 2 OFDM symbols. Further, a seed of a pseudorandom number for DMRS generation may be changed depending on a position of the OFDM symbol where the DMRS is arranged. For example, in the example of FIG. 9, it is assumed that the DMRS is arranged from the position of symbol number 2 in the slot, but the DMRS may be arranged from a position of symbol number 3. In this case, when the seed number is changed by a position of the DMRS, the seed number may be determined by a function and parameters as nID=f (x, N, y, c, z), where the seed number is nID, x is a DMRS position (for example, symbol number), N is the number of REs required for a DMRS in each symbol, y is the number of OFDM symbols including a DMRS in the slot, c is a cell ID, and a higher layer parameter is z.

Figure 10:
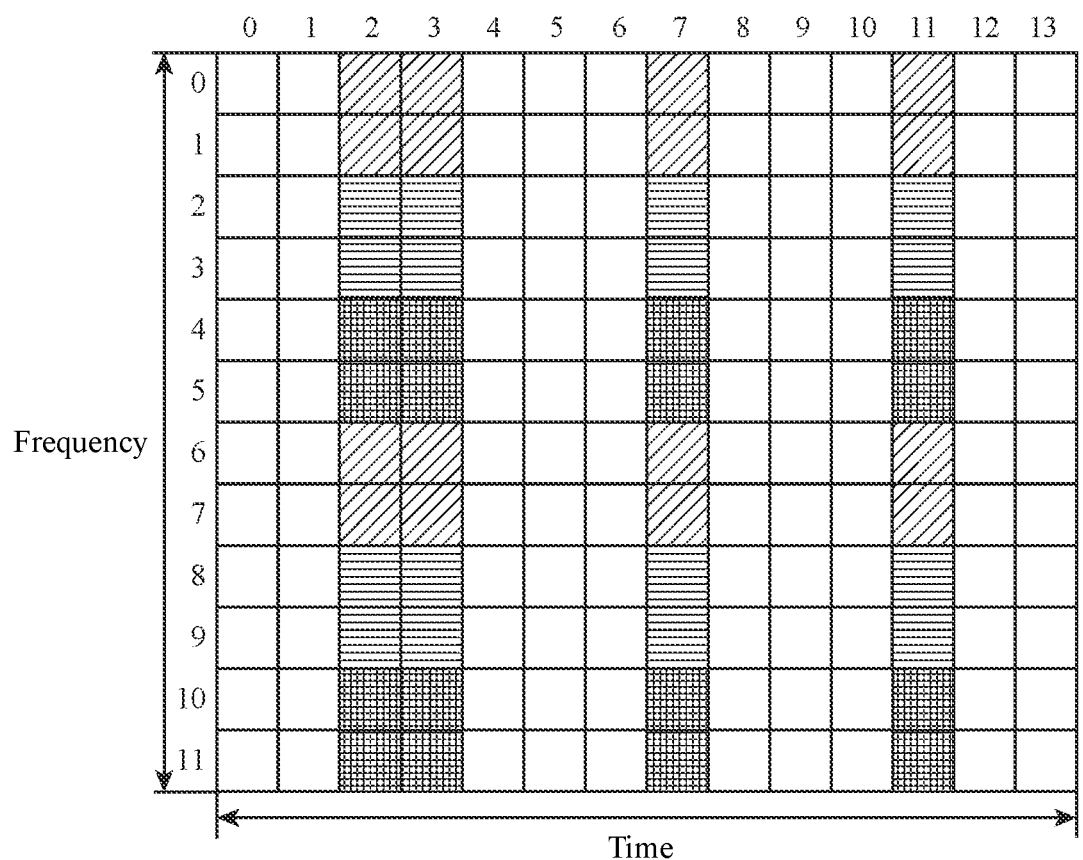
FIG. 10 is an explanatory diagram showing DMRS arrangement of a 4OFDM symbol in the transmission device according to the first embodiment of the present invention.

The above generation method can also be applied to a case where a DMRS of 2 OFDM symbols or more are arranged. For example, as shown in FIG. 10, 4 OFDM symbols are arranged in a slot. As described above, a duplicate of a DMRS sequence arranged in the first OFDM may be created, and the same DMRS sequence may be arranged in all 4 OFDMs. Also, a duplicate of a DMRS sequence arranged in the first 2 OFDM symbols may be created and used as a DMRS for an added 2 OFDM symbols. Also, a DMRS sequence for four symbols may be created. In the above scheme, a random number seed may be determined using a higher layer, a lower layer, or both layers. Further, as described above, it may be determined by a position of the symbol. Further, a seed number may be changed depending on the number of the symbol. For example, symbol numbers (1, 2, 3, and 4 in the example of FIG. 10) may be used as parameters in the above-described function for determining the seed number. For example, when the symbol number is g, an output of the function can be expressed as follows: nID=f (x, N, y, c, z, g).

Further, as described later, a PN sequence of an additional DMRS and a FL DMRS may be changed. In this case, in the above-described generation formula, a flag indicating whether the additional DMRS or the FL DMRS may be used as an input value. Further, a PN sequence may be generated by using an ID assigned on a network to each terminal such as radio network temporary Id (RNTI) as in the LTE. When MIMO transmission is performed using a plurality of panels such as Massive MIMO, a random number may be generated on the basis of a panel number.

Here, an example in which a DMRS is transmitted using a 1 OFDM symbol will be described. Using a row number in a DCI table in the DCI, the terminals 2-1 to 2-5 are notified of a port number corresponding to a position of a sent DMRS. After decoding the DCI information, the terminals 2-1 to 2-5 perform transmission path estimation using the DMRS at the position corresponding to the port number determined by the standard. If necessary, a layer and multiuser multiplexing are released. A multiplexing method includes a multiplexing method using the OCC as described above or a multiplexing method using phase rotation as shown in a second embodiment described later. An example of a DCI table in a case of using the above-mentioned OCC is shown in FIG. 11. In FIG. 11, the table is divided into two columns. This is divided into the two columns because it is assumed that, when the number of layers transmitted to one terminal is equal to or more than five, transmission is performed using two streams of encoded information stream. $n_{SCID}$ indicates a scrambling ID and is a parameter value necessary for the random number generation described above. Note that it may be prepared as a part of parameters of a function for $n_{SCID}$ seed generation. In the example of FIG. 11, two $n_{SCID}$s are prepared, but two or more seeds may be prepared. For example, when a value is 0, a DMRS arranged in (0, 2), (1, 2), (6, 2), (7, 2) may be used in the example in FIG. 8. Also, when 12 is selected, the terminals 2-1 to 2-5 are notified that DMRS arranged in (0, 2), (1, 2), (6, 2), (7, 2) is used and spatially multiplexed using a 2-bit OCC.

Note that, when seed generation parameters are set in the higher layer and the lower layer, priority of a seed number of a DMRS generation pseudorandom number generator designated in the higher layer becomes higher. When the seed number is not designated in the higher layer, a seed number designated in the lower layer is used for DMRS generation. Note that, when random numbers can be variably generated in the higher layer or the lower layer as described above, it is not necessary to include the seed number in the DCI table. To simplify notation, the $n_{SCID}$ is not included in DCI tables shown after FIG. 11.

Note that, when up to six ports are multiplexed using two symbols as FL, the terminals 2-1 to 2-5 are notified of the number of symbols used for DMRS in the higher layer, that is, one or two, and the terminals 2-1 to 2-5 are notified of a row number in the DCI table using a number in the DCI table. An advantage of notifying the number of OFDM symbols for a DMRS in the higher layer is that, in an application in which there is no need to change the number of OFDM symbols for the DMRS, that is, in an environment where a transmission path environment does not change significantly for a long time, by achieving a substantially fixed setting in the higher layer, it is possible to reduce an amount of control information necessary for the lower layer that changes frequently. As described above, when a DMRS included in the second OFDM symbol is the same as that of the first OFDM symbol, the terminals 2-1 to 2-5 may refer to the number of symbols specified in the higher layer and a DMRS pattern shown in the DCI table of FIG. 11.

Figure 12:
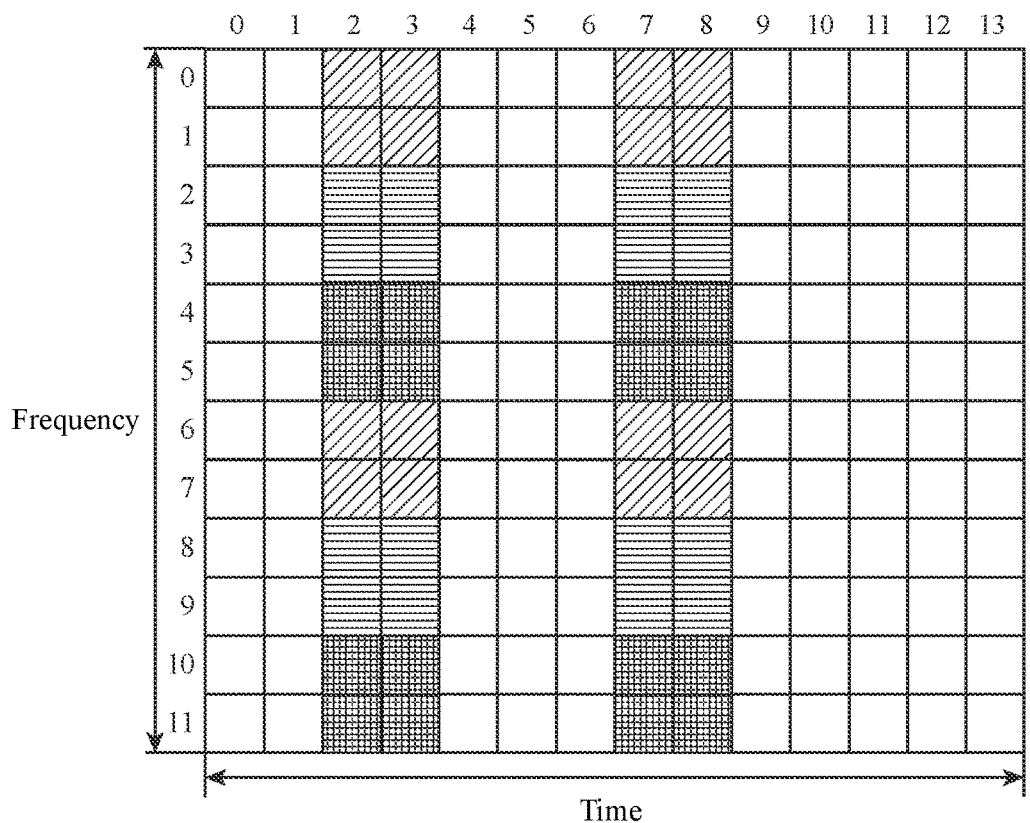
FIG. 12 is an explanatory diagram showing another DMRS arrangement of the 4OFDM symbol in the transmission device according to the first embodiment of the present invention.

FIG. 12 shows DMRS arrangement positions for 4 OFDM symbols. In this example, two symbols are continuously arranged at two locations in a slot. In FIG. 12, a DCI table is divided into two columns. This is divided into the two columns because it is assumed that, when the number of layers transmitted to one terminal is equal to or more than five, transmission is performed using two streams of encoded information stream.

Further, when up to six ports are multiplexed using two symbols as FL, when the terminals 2-1 to 2-5 are notified of the number of symbols used for a DMRS in a lower layer, the number of symbols may be included in the DCI table. When there is a significant change in a transmission path environment, the number of users, or the number of required layers, the terminals 2-1 to 2-5 may be notified of the number of OFDM symbols in the lower layer. Specifically, when the number of OFDM symbols and the corresponding port number and number of layers are notified, information is included in the DCI table. At that time, the number of OFDM symbols (1 or 2) is included in the description in the DCI table.

Further, in the example shown in FIG. 9, transmission up to twelve ports is possible using a 4-bit OCC. For example, $s_0$ is arranged in (0, 2), $s_1$ in (1, 2), $s_2$ in (6, 2), and $s_3$ in (7, 2). Further, $t_0$ is arranged in (0, 3), $t_1$ in (1, 3), $t_2$ in (6, 3), and $t_3$ in (7, 3). For example, in a DMRS for a port 0, $s_0$ is arranged in (0, 2), $s_1$ in (1, 2), $t_0$ in (0, 3), and $t_1$ in (1, 3). In a DMRS for a port 1, $s_0$ is arranged in (0, 2), $-s_1$ in (1, 2), $t_0$ in (0, 3), and $-t_1$ in (1, 3). In a DMRS for a port 6, $s_0$ is arranged in (0, 2), $s_1$ in (1, 2), $-t_0$ in (0, 3), and $-t_1$ in (1, 3).

Figure 13:
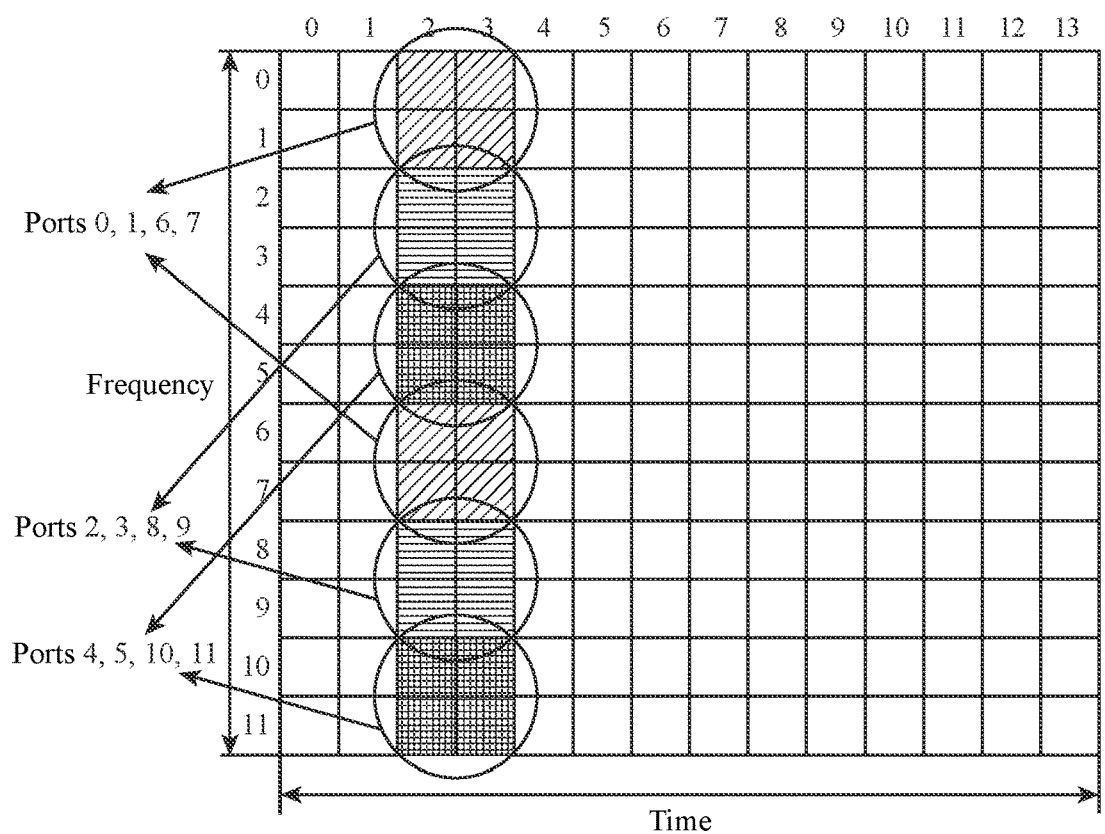
FIG. 13 is an explanatory diagram showing DMRS arrangement and port mapping of the 2OFDM symbol in the transmission device according to the first embodiment of the present invention.

Then, in a DMRS for a port 7, $s_0$ is arranged in (0, 2), $-s_1$ in (1, 2), $-t_0$ in (0, 3), and $+t_1$ in (1, 3). Similarly, in a DMRS for the port 0, $s_2$ is arranged in (6, 2), $s_3$ in (7, 2), $t_2$ in (6, 3), and $t_3$ in (7, 3). In a DMRS for the port 1, $s_2$ is arranged in (6, 2), $-s_3$ in (7, 2), $t_2$ in (6, 3), and $-t_3$ in (7, 3). In a DMRS for the port 6, $s_2$ is arranged in (6, 2), $s_3$ in (7, 2), $-t_2$ in (6, 3), and $-t_3$ in (7, 3). Then, in a DMRSs for the port 7, $s_2$ is arranged in (6, 2), $-s_3$ in (7, 2), $-t_2$ in (6, 3), and $+t_3$ in (7, 3). In other words, 4 multiplexing is possible by using the 4-bit OCC. Then, the same processing is applied to REs indicated by horizontal lines or grids in FIG. 9. In other words, 12 multiplexing is possible by using the 4-bit OCC. A mapping diagram to ports is shown in FIG. 13. Note that multilayer transmission is also possible without using an OCC. For example, according to an example of FIG. 13, ports 0, 1, 6, and 7 can be multiplexed, and multiple layers can be transmitted simultaneously. However, it is also possible to transmit ports 0, 2, and 4 simultaneously and transmit multiple layers without using the OCC. In this case, multilayer multiplexing is performed using frequency multiplexing.

Figures 15, 16:
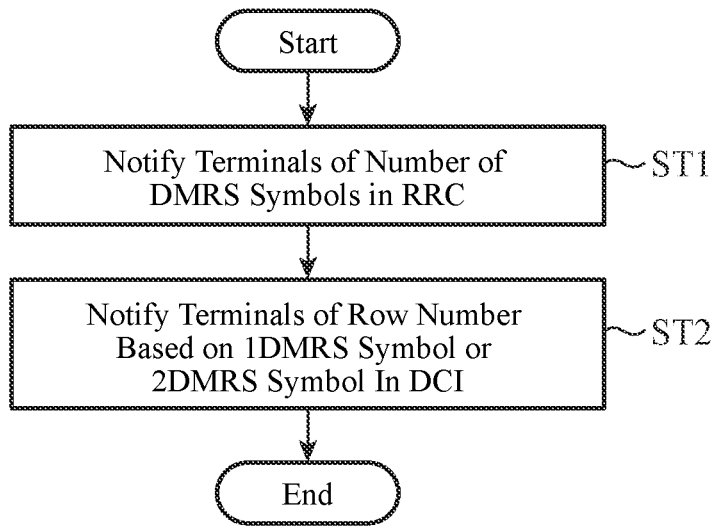
FIG. 15 is a flowchart showing operation of determining the number of DMRS symbols in a higher layer and notifying terminals of information described in a DCI table in lower layer control information in the transmission device of the first embodiment of the present invention.
FIG. 16 is an explanatory diagram showing a DCI table for the 1OFDM symbol in the transmission device according to the first embodiment of the present invention.

It is also possible to notify the number of symbols in the higher layer and use one symbol or two symbols separately. When only 1 OFDM symbol is used for DMRS transmission, the DCI table shown in FIG. 11 may be used. As shown in FIG. 13, when 2 OFDM symbols are used for DMRS transmission using the 4-bit OCC, a DCI table shown in FIG. 14 may be used. In other words, the corresponding DCI table is used on the basis of an instruction of the higher layer. FIG. 15 shows a flowchart for determining the number of DMRS symbols in the higher layer (RRC) and notifying a row number of the DCI table corresponding to one symbol or two symbols in the lower layer (DCI). In other words, the terminals are notified of the number of DMRS symbols in the RRC (step ST1), and then the terminals are notified of a row number based on a 1 DMRS symbol or 2 DMRS symbols in the DCI (step ST2). Additionally, in the above, the term "DMRS symbol" indicates an OFDM symbol containing a DMRS.

Further, when a transmission path environment changes significantly, DMRSs of three symbols or more may be arranged as shown in FIG. 10. By additionally arranging the DMRS, transmission path estimation values can be averaged, and estimation accuracy is improved. In the example shown in FIG. 10, a DMRS symbol is arranged at symbol numbers 2, 3, 7, and 11 in the slot. In other words, two symbols are arranged in frontloaded. Then, up to six ports are supported within the frontloaded. In this case, the same number of ports is supported in additional DMRS symbols. For example, row number 6 in the DCI table of FIG. 14 is selected in the example of FIG. 10. In this case, at symbol numbers 7 and 11 in FIG. 10, DMRSs corresponding to the number of ports or a mode corresponding to row number 6 (2 layer) in the DCI table of FIG. 14 are also arranged. Since the number of OFDM symbols arranged at symbol numbers 7 and 11 is one symbol, row number 6 (2 layer) in FIG. 16 is selected. FIG. 16 is a DCI table for a 1 OFDM symbol.

Note that, even when a DMRS is added, the number of ports supported by the base station 1, the number of multiplexing layers, or the number of multiplexed users cannot be increased. The added DMRS is only used to improve characteristics.

In addition, in order to simplify illustration, in FIGS. 10 and 12, it is assumed that DMRSs are arranged in REs indicated by diagonal lines, horizontal lines, and grids. However, it is not necessary to arrange DMRS in all REs. When the required number of layers is small, the DMRS may be arranged only in some REs in the FL and additionally transmitted OFDM symbol. For example, in FIGS. 10 and 12, DMRSs may be arranged only in the REs indicated by the diagonal lines. In that case, nothing may be arranged in the RE in which the DMRS is not arranged for interference measurement from multiple users, adjacent cells, or other layers, or data may be arranged.

Further, DCI tables shown in FIGS. 14 and 17 are both when the number of OFDM symbols in FL is 2, but row numbers are different. The row numbers in FIG. 14 are assigned to match the row numbers in the DCI table in FIG. 16. This is because, when the OFDM including the DMRS as described above is additionally arranged one symbol at a time, the row numbers are designed to match. When the row numbers match, information notified to the terminals can be shared. For example, as described above, DMRS information of the OFDM symbol in the FL is row number 6, and the row number of the added DMRS information is also 6.

In the above example, a configuration in which two symbols are arranged in the FL and one symbol is arranged one by one thereafter has been described. However, as shown in FIG. 12, an OFDM containing DMRSs of two symbols in FD and those of two symbols thereafter may be arranged. In this case, the same DCI table is used for each group (one group consists of 2 OFDM symbols including a DMRS).

Further, positions of the OFDM symbol including the subsequent DMRS other than the above-mentioned FL are determined in advance. Accordingly, an OFDM symbol containing a DMRS cannot be arranged after the FL except for a predetermined position. This is to avoid collisions because other types of RSs, such as Channel State Information RS and Phase Tracking RS, can be inserted into REs of other symbols. For example, as shown in FIG. 12, two symbols from symbol number 7 may be designated as symbols for an additional DMRS. Alternatively, as shown in FIG. 10, symbol numbers 7 and 11 may be designated as the symbols for the additional DMRS.

Note that the number of OFDM symbols including a DMRS added other than FL can be set adaptively and that the terminals are notified using DCI or the like. For example, an OFDM symbol containing an added DMRS can be arranged at symbol number 7 and symbol number 8. As shown in FIG. 12, the OFDM symbol including the additional DMRS may be two symbols and may be arranged at symbol number 7 and symbol number 8. Alternatively, the number of additional symbols may be one, and an OFDM symbol containing a DMRS may be arranged at symbol number 7 or symbol number 8. As described above, since the location where the OFDM symbol containing the additional DMRS is arranged is determined in advance, the terminals may be notified of the number of additional DMRS symbols and supported port numbers in the higher layer and the lower layer. For example, the terminals may be notified by using DCI of the number of OFDM symbols including the additional DMRS or the supported port numbers. Alternatively, the terminals may be notified in RRC of the number of OFDM symbols including the additional DMRS or the supported port numbers. When notifying the supported port numbers, a DCI table may be used. Using the above example, the number of OFDM symbol candidates including an additional DMRS is 0, 1, 2. When an OFDM symbol including a DMRS is not added, a flag may be sent in the higher layer or the lower layer. For example, when a flag is zero, the number of additional OFDM symbols is zero, and when the flag is one, the number of added OFDM symbols is equal to or more than one. By changing the number of OFDM symbols including an adaptively added DMRS, even in a transmission path where amplitude and a phase of a transmission signal fluctuate over time, it is possible to prevent degradation of demodulation characteristics without degrading transmission path estimation accuracy. Note that in the present embodiment for the OFDM symbol including the added DMRS, an FL symbol can be used by sharing with one or two FL symbols that support fewer ports than the maximum number of ports that can be supported, such as using two symbols to support six ports.

Further, setting of the additional DMRS is performed using RRC, MAC-CE, DCI, or the like. Since the additional DMRS is used for improving transmission path estimation characteristics, it is transmitted to the terminals. In this case, the following candidates are considered.

Candidate 1: An additional DMRS is transmitted at a frequency determined in the higher layer (for example, the RRC)

Candidate 2: An additional DMRS is transmitted at a frequency determined for a certain period of time in the higher layer (for example, the RRC)

Candidate 3: DMRS transmission is requested from the terminals 2-1 to 2-5, and after receiving the request from the terminals 2-1 to 2-5, the base station 1 transmits a certain number of OFDM symbols containing a DMRS in a section where an additional DMRS is determined.

Figure 18:
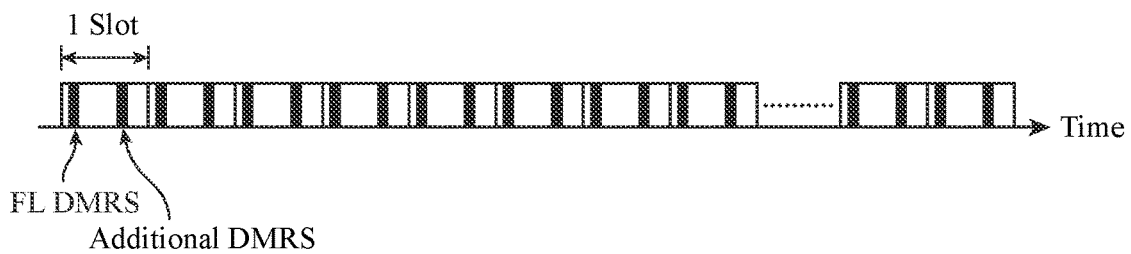
FIG. 18 is an explanatory diagram showing an example in which an additional DMRS is sent every slot in the transmission device according to the first embodiment of the present invention.
Figure 19:
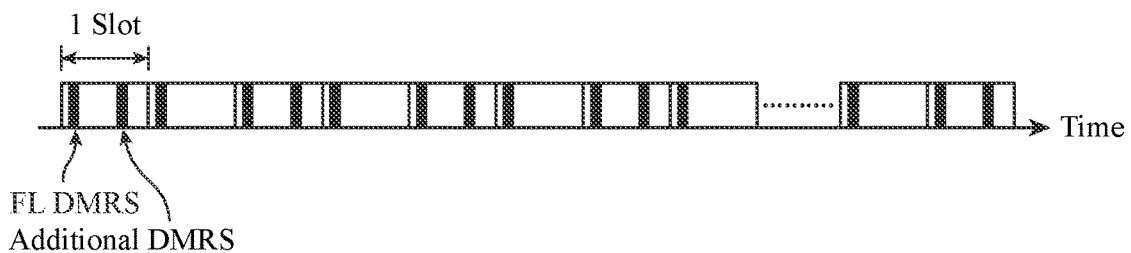
FIG. 19 is an explanatory diagram showing an example in which an additional DMRS is sent every other slot in the transmission device according to the first embodiment of the present invention.
Figure 20:
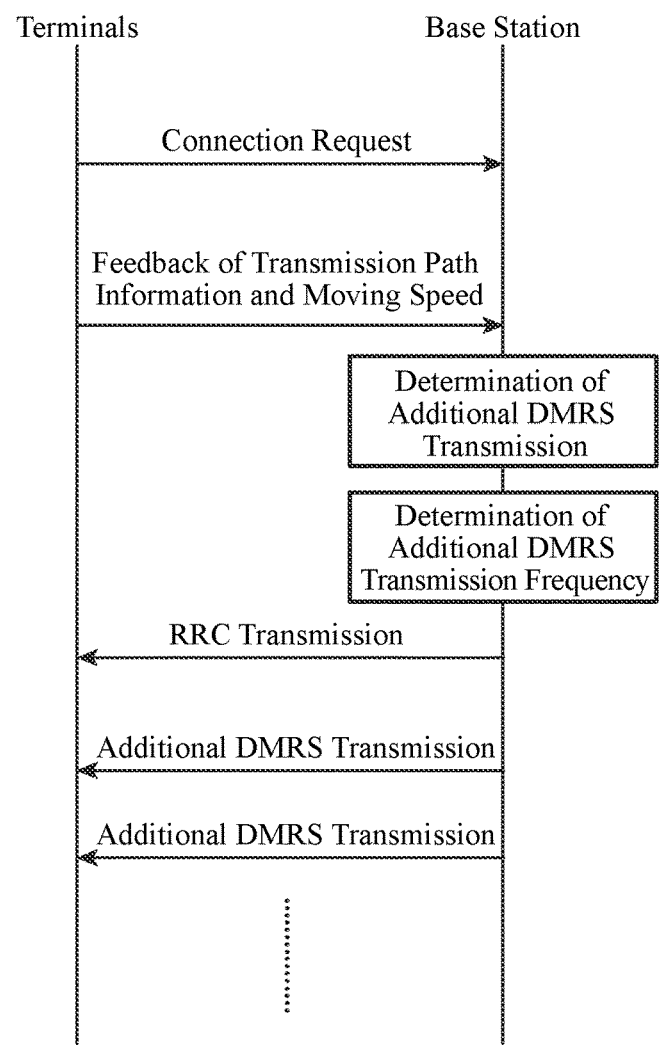
FIG. 20 is a sequence chart of a candidate 1 of the transmission device according to the first embodiment of the present invention.

As an example of the above frequency, it is conceivable that an additional DMRS symbol is transmitted every slot or every other slot. For example, an example of the above candidate 1 is shown in FIGS. 18 and 19. FIG. 18 shows an example in which the additional DMRS is transmitted every slot. In the example, it is assumed that an FL DMRS is always inserted. In FIG. 19, it is assumed that the additional DMRS is transmitted every other slot. In the candidate 1, unless there is an abort request for additional DMRS transmission from the base station 1 or the terminals 2-1 to 2-5, the additional DMRS is transmitted. FIG. 20 shows a sequence chart showing information exchange between the base station 1 and the terminals 2-1 to 2-5. After receiving a connection request and transmission path information from the terminals 2-1 to 2-5, the base station 1 determines a transmission frequency of the additional DMRS and periodically transmits the DMRS.

Figure 21:
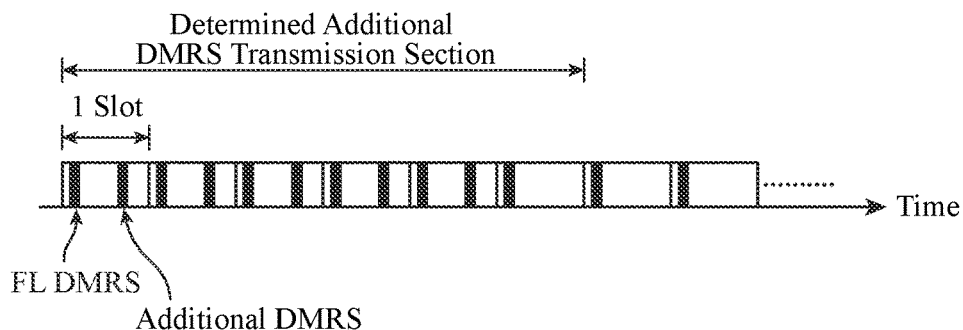
FIG. 21 is an explanatory diagram showing an example in which an additional DMRS is transmitted within a certain period of time in the transmission device according to the first embodiment of the present invention.
Figure 22:
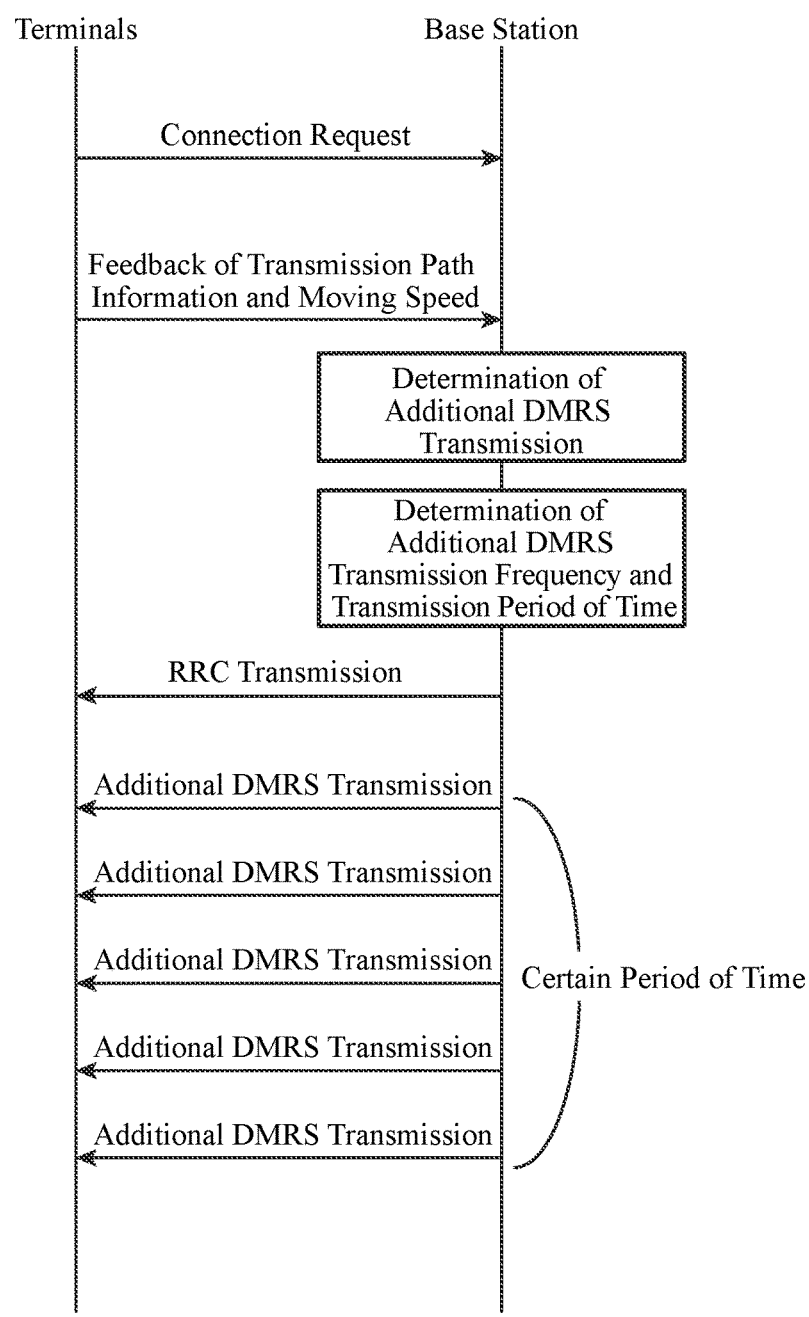
FIG. 22 is a sequence chart of a candidate 2 of the transmission device according to the first embodiment of the present invention.

In the above candidate 2, the certain period of time is the determined number of slots, number of symbols, and time (unit: second). There are a number of candidates, from which it may be chosen. In the candidate 2, transmission of the additional DMRS automatically stops after the certain period of time. An example is shown in FIG. 21. In the example shown in FIG. 21, the additional DMRS is transmitted over five slots, and thereafter only an FL DMRS is transmitted. FIG. 22 shows a sequence chart. After receiving a connection request and transmission path information from the terminals 2-1 to 2-5, the base station 1 determines a transmission frequency of the additional DMRS, and transmits the additional DMRS for a certain period of time (five slots in the illustrated example).

Figure 23:
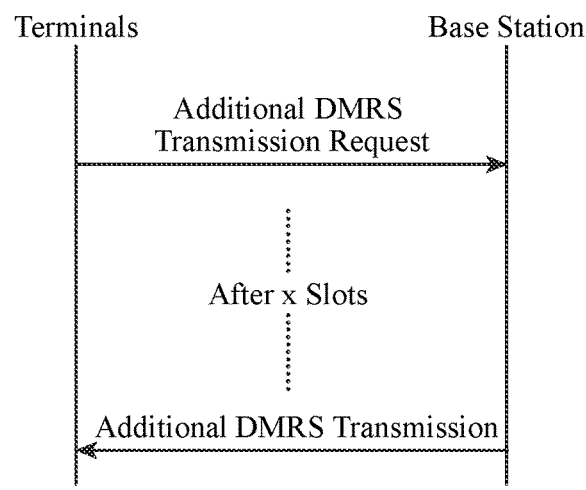
FIG. 23 is a sequence chart of a candidate 3 of the transmission device according to the first embodiment of the present invention.

In the above candidate 3, an amount of DMRS requested from the terminals 2-1 to 2-5 is temporarily transmitted. Note that the DMRS is transmitted after elapse of a certain period of time since the request is received. FIG. 23 shows a sequence chart. After reception of the additional DMRS transmission request from the terminals 2-1 to 2-5, the additional DMRS is transmitted after the certain period of time. A time from reception of the request to transmission of the additional DMRS is predetermined.

Figure 24:
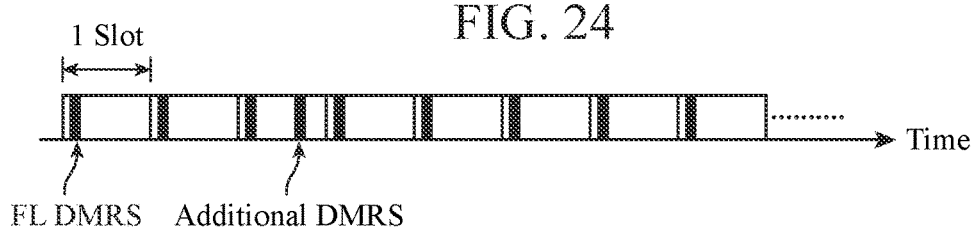
FIG. 24 is an explanatory diagram showing an example in which an additional DMRS is transmitted only once in the transmission device according to the first embodiment of the present invention.

Further, as shown in FIG. 24, the additional DMRS may be transmitted only once.

Also, a slot level offset different for each of the terminals 2-1 to 2-5 may be used so that the additional DMRSs do not collide between the different terminals 2-1 to 2-5.

In addition, the above setting may be performed in the higher layer or the lower layer. In a case of the candidate 1, regular transmission or regular transmission for a certain period of time may be determined on the basis of the transmission path information transmitted from the terminals. At the regular transmission or for the transmission period of the additional DMRS, transmission may be made to the terminal side using the higher layer (RRC) or the like. The temporary additional DMRS transmission may be performed on the basis of a request from the terminals. The transmission frequency and transmission period setting described above are determined by the information processing unit 101.

As described above, a transmission device of the first embodiment includes: a multiplexing unit for multiplexing a reference signal to data to be transmitted; and an information processing unit for determining, when a reference signal generated by a pseudorandom number is arranged on specified time and frequency, whether or not to arrange a 1 OFDM symbol or 2 OFDM symbols including a reference signal at a position determined in each slot, and for determining whether or not to additionally arrange an OFDM symbol including a reference signal in the same slot. The multiplexing unit performs the multiplexing in accordance with the determination by the information processing unit. Therefore, the number of spatial multiplexing in multiuser MIMO increases, and a transmission rate can be improved. In addition, since different sequences can be selected, inter-cell interference can be randomized, which contributes to reduction of the inter-cell interference. In addition, a transmission amount of control information in a transmission signal can be suppressed.

Also, according to the transmission device of the first embodiment, the information processing unit makes a determination to notify whether or not to arrange the 1 OFDM symbol or the 2 OFDM symbols in a higher layer of a transmission signal. Therefore, in an environment where a transmission path environment does not change significantly for a long time, by achieving a substantially fixed setting in the higher layer, it is possible to reduce an amount of control information necessary for a lower layer that changes frequently.

Further, according to the transmission device of the first embodiment, the information processing unit makes a determination to transmit the additionally arranged OFDM symbol including the reference signal at a set frequency, so that an increase in control information can be suppressed.

Further, according to the transmission device of the first embodiment, the information processing unit makes a determination to transmit the additionally arranged OFDM symbol including the reference signal only for a set certain period of time, so that an increase in control information can be suppressed.

In addition, according to the transmission device of the first embodiment, the information processing unit makes a determination to transmit the additionally arranged OFDM symbol including the reference signal in response to a request from a reception device for receiving a transmission signal, so that an increase in control information can be suppressed.

Second Embodiment

In the first embodiment, the example of multiplexing using the OCC has been shown. However, by giving frequency multiplexing and phase rotation to each DMRS and maintaining orthogonality, it is possible to transmit the DMRS. This will be described next in a second embodiment. Note that since a configuration of a transmission device on the drawing is the same as the configuration shown in FIG. 2, and it will be described with reference to FIG. 2.

Figure 25:
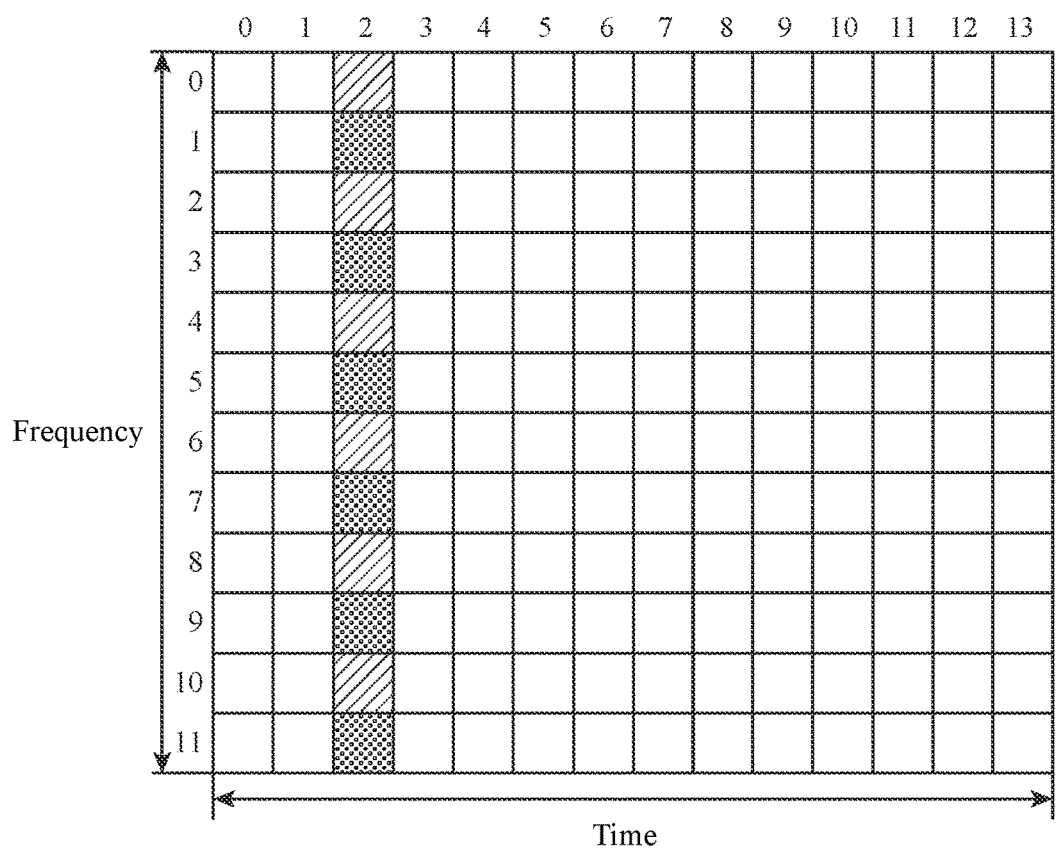
FIG. 25 is an explanatory diagram showing an example of DMRS arrangement in a 1OFDM symbol in a transmission device according to a second embodiment of the present invention.

When a phase rotation amount is 0 and N is the number of DMRS symbols giving phase rotation, each DMRS symbol is multiplied by $e^{j\theta n}$ (n=0, 1, . . . , N−1) in a frequency domain. Because the phase rotation is given to the DMRS in frequency so that a cyclic shift occurs on a time, it is also called a cyclic shift (CS) method. As described above, by giving different cyclic shift amounts to DMRS sequences, orthogonality occurs between the DMRS sequences, so that DMRS sequence multiplexing can be performed by a method different from the above-described OCC. An example is shown in FIG. 25. Note that, when the CS method is used, as shown in FIG. 25, DMRS arrangement is generally arrangement such as interleaved frequency domain multiplexing (IFDM), that is, arrangement in which a DMRS is arranged every other RE. Here, an example using the OCC is called a configuration 1, and an example using the IFDM is called a configuration 2. In the configuration 2, since DMRSs are evenly arranged on the frequency, the configuration is suitable for a transmission path having frequency selectivity. Note that, since the configuration is a name of setting, the DMRS arrangement setting described above is referred to as the configuration 1 or the configuration 2 for simplification of notation.

Figure 26:
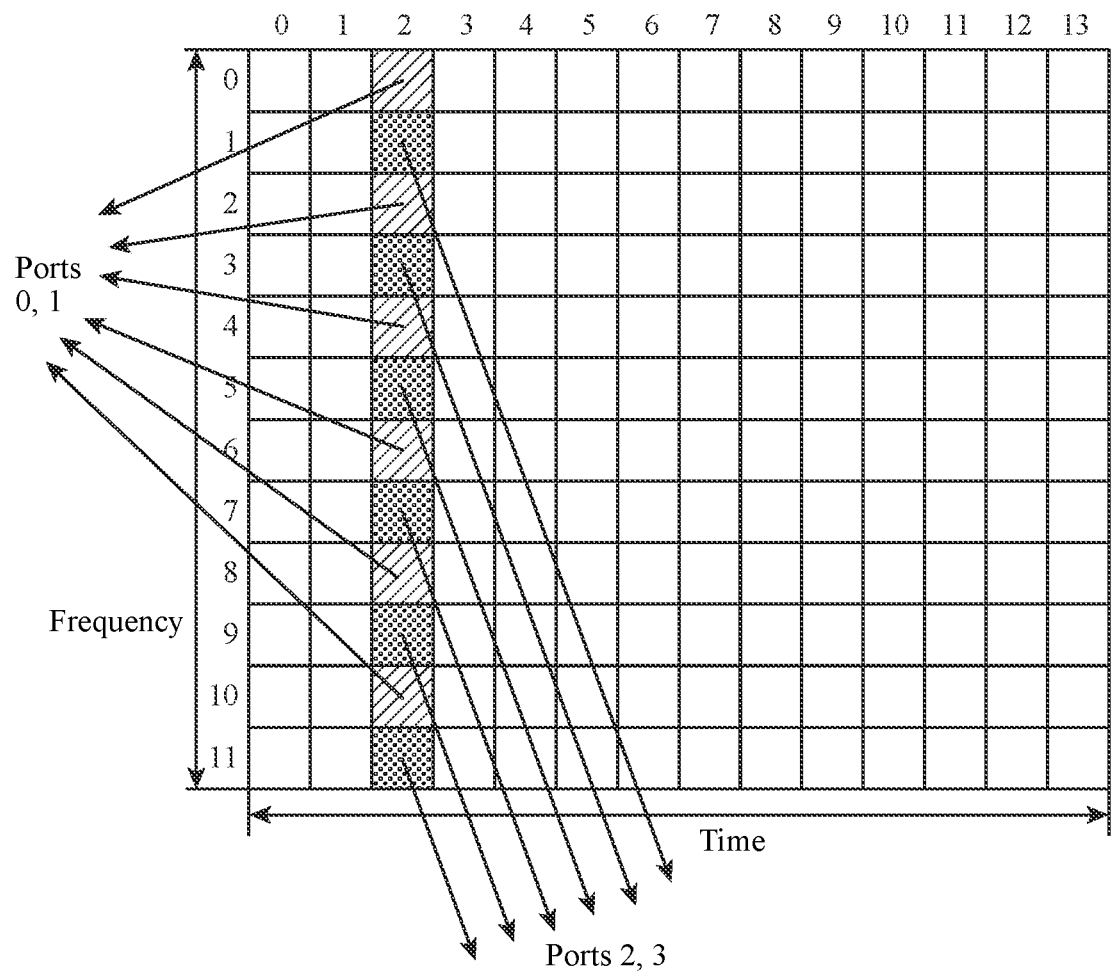
FIG. 26 is an explanatory diagram showing an example when a CS method is used in the DMRS arrangement in the 1OFDM symbol in the transmission device according to the second embodiment of the present invention.

When one of the two configurations is selected, the transmission device needs an individual control signal, and thus it is necessary to reduce control information. When the allowable number of layers is different between the configuration 1 and the configuration 2, an unsupported number is not selected in a common DCI table. Since the OCC for the 1 OFDM symbol described in the first embodiment has two bits, the number of layers that can be multiplexed in each group is two. The configuration 1 can correspond to a total of six ports, while the configuration 2 can correspond to a total of four ports. As shown in FIG. 26, in the CS method, when two types of CS amounts are prepared for a DMRS group arranged in REs indicated by diagonal lines, the number of multiplexed layers is two. Also, when two types of CS amounts are prepared for a DMRS group arranged in REs indicated by halftone dots, the number of multiplexed layers is two, and port numbers 2, 3 are supported. Since both the configuration 1 and the configuration 2 can support up to two-layer multiplexing in each group, it is possible to share the contents of the DCI table and reduce an amount of control information. In other words, an information processing unit 101 of the second embodiment includes a plurality of methods for determining either arrangement of a 1 OFDM symbol or 2 OFDM symbols containing a reference signal or arrangement of an additionally arranged OFDM symbol including a reference signal, and is configured to use a common DCI format in these plurality of methods.

Figure 27:
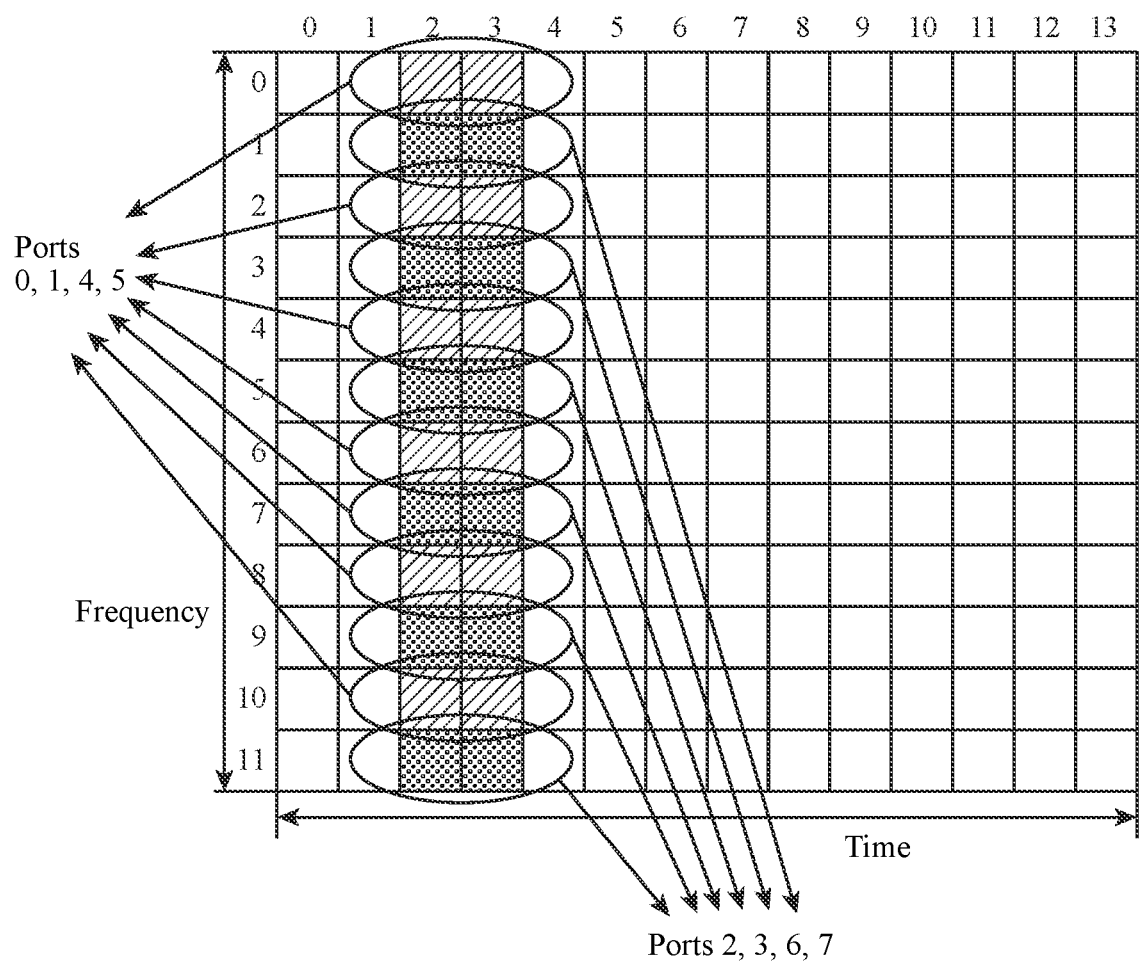
FIG. 27 is an explanatory diagram showing an example of DMRS arrangement in a 2OFDM symbol in the transmission device according to the second embodiment of the present invention.

In addition, by using a 2-bit OCC over a time domain, multiplexing can be further doubled. FIG. 27 shows an example in which the 2 OFDM symbols are used as an example, the 2-bit OCC is used over a time domain, and two CS amounts are prepared in a frequency domain.

In addition, the configuration 1 or the configuration 2 can be properly used depending on a usage environment. For example, because DMRSs are evenly arranged in frequency, the configuration 2 is a configuration suitable for a transmission path having frequency selectivity. On the other hand, since DMRSs are arranged in adjacent REs, the configuration 1 is more robust than the configuration 2, and is assumed to be used in a use case that requires the number of multiplexing. In other words, since the configuration 1 and the configuration 2 are switched depending on the environment, it is necessary that a control signal is sent in a small amount.

An example of a DCI table is shown in FIG. 28. As an example, the DCI tables when FIG. 7 (configuration 1) and FIG. 26 (configuration 2) are used are shown. As is clear from the table, the DCI table is the same as the DCI table used in the configuration 1. As described above, since only the total of four ports are supported in the configuration 2, some of the options in the table of FIG. 28 cannot be used in the configuration 2. For example, numbers 8 to 11, 16, and 17 are not supported in the configuration 2. This is because port numbers 4, 5 can only be used when the number of ports that can be supported is equal to or more than five. Generally, use of the configuration 1 or the configuration 2 is set in a higher layer such as an RRC, so that a port to which the selected configuration cannot correspond is not selected.

When a different DCI table is used, the DCI table in FIG. 28 is used for the configuration 1. A DCI table shown in FIG. 29 is a DCI table used for the configuration 2. FIG. 30 shows a DCI table corresponding to the DMRS arrangement example shown in FIG. 27.

When a common DCI table is used for the configuration 1 and the configuration 2, a DCI table as shown in FIG. 31 can be used. When FIG. 30 and FIG. 17 are compared, port mapping is different between different configurations. Therefore, in FIG. 31, a common name is used to indicate a port number. For example, in the configuration 1, a port group 1-1 has port numbers 0 and 1, and a port group 1-2 has port numbers 6 and 7. In the configuration 2, a port group 1-1 has port numbers 0 and 1, and a port group 1-2 has port numbers 4 and 5. A correspondence table as shown in FIG. 32 may be determined.

When a common DCI table cannot be used, different DCI tables may be used depending on the configuration in accordance with a selected configuration number.

As described above, according to the transmission device of the second embodiment, the information processing unit includes a method for determining arrangement of the 1 OFDM symbol or the 2 OFDM symbols containing the reference signal or a configuration of the additionally arranged OFDM symbol including the reference signal, and is configured to use a common DCI format in these plurality of arrangement and the configuration. Therefore, in addition to the effects of the first embodiment, processing suitable for a target transmission path can be performed.

It is to be noted that the present invention can freely combine embodiments, modify arbitrary components in the embodiments, or omit arbitrary components in the embodiments within the scope of the invention.

INDUSTRIAL APPLICABILITY

As described above, a transmission device according to the present invention relates to a configuration in which a reference signal generated by a pseudorandom number is arranged on specified time and frequency, and is suitable for multiplexing multiple layers for multiple users on a transmission side in multiuser MIMO.

REFERENCE SIGNS LIST

1: base station,
2-1 to 2-5: terminal,

100: reference signal and data multiplexing unit,
101: information processing unit,
102: control signal generating unit for data signal,
103: control signal generating unit for reference signal,
104: control signal generating unit,
105: control signal generating unit for multiplexing,
106: reference signal generating unit,
107: data generating unit,
108: multiplexing unit,
200: reception unit,
300: precoding unit, and
400: transmission unit.

The invention claimed is:

1. A transmission device comprising a processing circuitry configured to:
   perform multiplexing a reference signal to data to be transmitted; and
   perform generating number information that indicates a number of symbols including the reference signal, the number information being informed to a terminal as a higher layer signal, and control information that causes the terminal to determine 1OFDM (orthogonal frequency division multiplexing) symbol allocation or 2OFDM symbol allocation based on the number information, the control information being informed to the terminal as a lower layer signal,
   wherein the processing circuitry performs the multiplexing in accordance with the control information generated by the generating.

* * * * *